(12) United States Patent
Kannan et al.

(10) Patent No.: US 7,761,321 B2
(45) Date of Patent: Jul. 20, 2010

(54) SYSTEM AND METHOD FOR CUSTOMER REQUESTS AND CONTACT MANAGEMENT

(75) Inventors: Pallipuram V. Kannan, Los Gatos, CA (US); Reagan Miller, Los Gatos, CA (US)

(73) Assignee: 24/7 Customer, Inc., Campbell, CA (US)

( * ) Notice: Subject to any disclaimer, the term of this patent is extended or adjusted under 35 U.S.C. 154(b) by 1185 days.

(21) Appl. No.: 11/360,145

(22) Filed: Feb. 22, 2006

(65) Prior Publication Data

US 2007/0198359 A1   Aug. 23, 2007

(51) Int. Cl.
G06Q 90/00 (2006.01)
G06Q 99/00 (2006.01)
(52) U.S. Cl. .............................. 705/8; 705/9
(58) Field of Classification Search .............. 705/8, 705/9; 709/219
See application file for complete search history.

(56) References Cited

U.S. PATENT DOCUMENTS

| | | | | |
|---|---|---|---|---|
| 6,389,028 B1* | 5/2002 | Bondarenko et al. | ........ | 370/401 |
| 6,523,022 B1* | 2/2003 | Hobbs | ........... | 707/3 |
| 7,120,700 B2* | 10/2006 | Macleod Beck et al. | .... | 709/242 |
| 7,181,444 B2* | 2/2007 | Porter et al. | ................. | 707/3 |
| 7,353,035 B1* | 4/2008 | Kupsh et al. | ................. | 455/466 |
| 2002/0047859 A1* | 4/2002 | Szlam et al. | ................. | 345/705 |
| 2002/0083067 A1 | 6/2002 | Tamayo et al. | | |
| 2003/0144895 A1 | 7/2003 | Aksu et al. | | |
| 2003/0174830 A1* | 9/2003 | Boyer et al. | ........... | 379/265.02 |
| 2004/0117383 A1 | 6/2004 | Lee et al. | | |
| 2005/0004978 A1* | 1/2005 | Reed et al. | ................. | 709/203 |
| 2005/0147090 A1 | 7/2005 | MacLeod Beck et al. | | |
| 2007/0244738 A1 | 10/2007 | Chowdhary et al. | | |

FOREIGN PATENT DOCUMENTS

EP   1513088 A1 *   3/2005

OTHER PUBLICATIONS

Denton, H., "Call Center Brings Quantifiable Advantages to Bottom Line," Electric Light and Power, p. 17, Jul. 1998.*
Jones, C., "Entrepreneur Offers Chance to Jump the Queue," Times Higher Education Supplement, No. 1718, p. 8, Nov. 19, 2005.*

(Continued)

*Primary Examiner*—Nicholas D Rosen
(74) *Attorney, Agent, or Firm*—Michael A. Glenn; Glenn Patent Group

(57) ABSTRACT

A method and a web-based system is provided that enables a customer service center of a company to provide its customers with a choice of different modes for establishing contact with customer service representatives. The different modes of contact are displayed on a single web page. The modes of contact include, but are not limited to call, chat, e-mail and Internet talk. Further, the system provides information regarding the estimated wait time and the less busy time for the modes of contact. In addition, the system and method provide means for conducting a search in a knowledge database for automated responses to queries from customers. The system and method enables the customer to provide feedback for each interaction with the customer service center through the web page. Further, the system and method enable the storage of all interaction between each customer and the customer service center.

32 Claims, 18 Drawing Sheets

OTHER PUBLICATIONS

Gans, Noah et al.; *Telephone Call Centers: A Tutorial and Literature Review*; 2003; In Manufacturing and Service Operations Management 5, No. 2, http://www.columbia.edu/~ww2040/tutorial.pdf.

International Search Report and Written Opinion for parallel PCT application No. PCT/US2009/035071, date of mailing May 4, 2009.

* cited by examiner

SYSTEM AND METHOD FOR CUSTOMER REQUESTS AND CONTACT MANAGEMENT

BACKGROUND

The present invention generally relates to the field of customer requests and contact management. More specifically, it relates to the field of providing solutions to customers' queries through a web-based system.

Due to the competitive environment, various companies are competing to provide better services to their customers, so that the customers have to put in a minimal effort to obtain solutions to their queries.

One of the problems faced by these companies is providing solutions to queries from customers in minimal time. The customers of a company may contact the customer service representatives of the company through various modes, such as a telephone call, chat, or e-mail, and they may have to wait for some time, perhaps a long period of time, before the customer service representatives respond.

In the present state of the art, companies provide a list of customer service contact numbers on their web pages. Some existing companies also have individual web interfaces to provide links for initiating other modes of contact.

However, companies may not be able to provide a customer with a single web page from which the customer can gather information about all the modes of contact the companies may provide. Moreover, companies may not notify the customer regarding the time for which the customer has to wait to get a response to a query. Further, these companies may not provide customers with an option to obtain solutions to their queries through an automated response system. This may lead to higher costs for providing services to their customers.

Moreover, in the present art, the availability of different modes of contact on separate web pages results in higher staffing requirements. At times, the customer is not aware of other alternatives to resolve his/her query or to make a request, which, in turn, increases the frequency of telephone calls to contact these companies. This leads to prominent peaks and valleys in the incoming and outgoing calling patterns of a company. In addition, customers are usually not informed about the new products and services launched by these companies. Moreover, companies may not conduct customer service related surveys. In case these companies conduct such surveys, they are costly, time consuming, or too cumbersome and complicated. Thus these companies may not keep track on customer feedback. In addition, companies may not maintain a comprehensive collection of data relating to interactions between the company and its customers.

In view of the foregoing, there is a need for a system and a method that would enable companies to provide better services to their customers. Further, there is a need for a system that provides various modes through which companies may be contacted on a single user interface or web page. Moreover, there is a need for a system that would enable companies to notify a customer about the time for which the customer has to wait before a response is provided to his/her query through the different modes of contact. Further, there is a need to provide a system that would enable companies to store certain automated responses to frequently asked questions by customers, thereby reducing the overall cost of providing services. In addition, there is a need to provide a system and a method that would enable companies to more easily conduct customer service related surveys as well as maintain comprehensive data related to interactions between companies and their customers.

SUMMARY

An objective of the invention is to enable a company with a customer service center to provide better services to customers in an easy and cost-effective way.

Another objective of the invention is to enable the company to provide all the modes through which the customers may contact the customer service center on a single web page. The modes of contact include, but are not limited to, call, chat, e-mail, Internet talk, and so forth.

Yet another objective of the invention is to provide the customers with shorter estimated wait times and access to less busy times for all the modes of contact through the web page.

Still another objective of the invention is to provide the customers with an automated response to a query entered by the customers through the web page. The automated response is provided by a knowledge database upon meeting certain criteria of appropriateness to the query.

Still another objective of the invention is to provide pay-for-service option to the customers through the web page. The customers may pay for a service to obtain a special set of privileges.

Still another objective of the invention is to conduct customer service related surveys and obtain feedback from the customers upon the completion of their requests.

Yet another objective of the invention is to provide customers with maps and directions to the available service and sales centers of the company.

Still another objective of the invention is to store interactions between the customers and the customer service center in a Customer Relationship Management (CRM) system.

To achieve the above-mentioned objectives, the present invention provides a method and a system for enabling the customers to access and obtain information regarding different modes of contact. Different modes of contact establish contact between the customers and the customer service center. The customers may obtain real-time information regarding 'estimated wait times' and 'less-busy times' for the modes of contact through the web page. Further, the present invention provides options such as a call-back option and a short message service (SMS) option to the customers through the web page. A customer may select the call-back option for a particular type of request. If the call-back option is selected, a customer representative would call the customer back at an appropriate time. In addition, the customer may select the SMS option. If the SMS option is selected, an SMS would be sent to the customer, updating him/her about the estimated wait time for a selected queue if the estimated wait time falls below a certain predetermined value within a specified time frame. In case the estimated wait time never falls below the predetermined value within the specified time frame, an SMS is sent to the customer. This SMS notifies the customer that the estimated wait time did not fall below the predetermined value in the specified time frame. Further, this SMS may additionally recommend to the customer other suitable time frames to call the customer service center.

In addition, the present invention provides a knowledge database search option to the customers, who may enter a query to search through the web page. The search is conducted in the knowledge database. An automated response is provided to the customers through the web page. Further, along with the automated response, a list of modes of contact, arranged on the basis of the estimated wait time and the type of request/query, is displayed on the web page.

Further, the present invention provides another option, pay-for-service, to the customers through the web page. The customers may pay for service and obtain an additional set of privileges. The set of privileges may include, but is not limited to, faster response to the request. For example, the pay-for-service option may include an option to pay a premium fee in order to exchange position in a queue of customers.

In addition, the present invention provides an interface to the customers to provide feedback on the completion of their request. This feedback is further utilized to analyze and improve the services being delivered to the customers.

Moreover, the present invention provides an option to the customers to retrieve maps and directions to the nearest location of a service or sales center.

In addition, the present invention provides a system and a method to store data relating to interactions between the customers and the customer service center in the CRM system. The interactions may be through the web page, a telephone call or any other means of communication.

BRIEF DESCRIPTION OF THE DRAWINGS

The preferred embodiments of the invention will hereinafter be described in conjunction with the appended drawings that are provided to illustrate, and not limit the invention, wherein like designations denote like elements, and in which.

Figure 1:
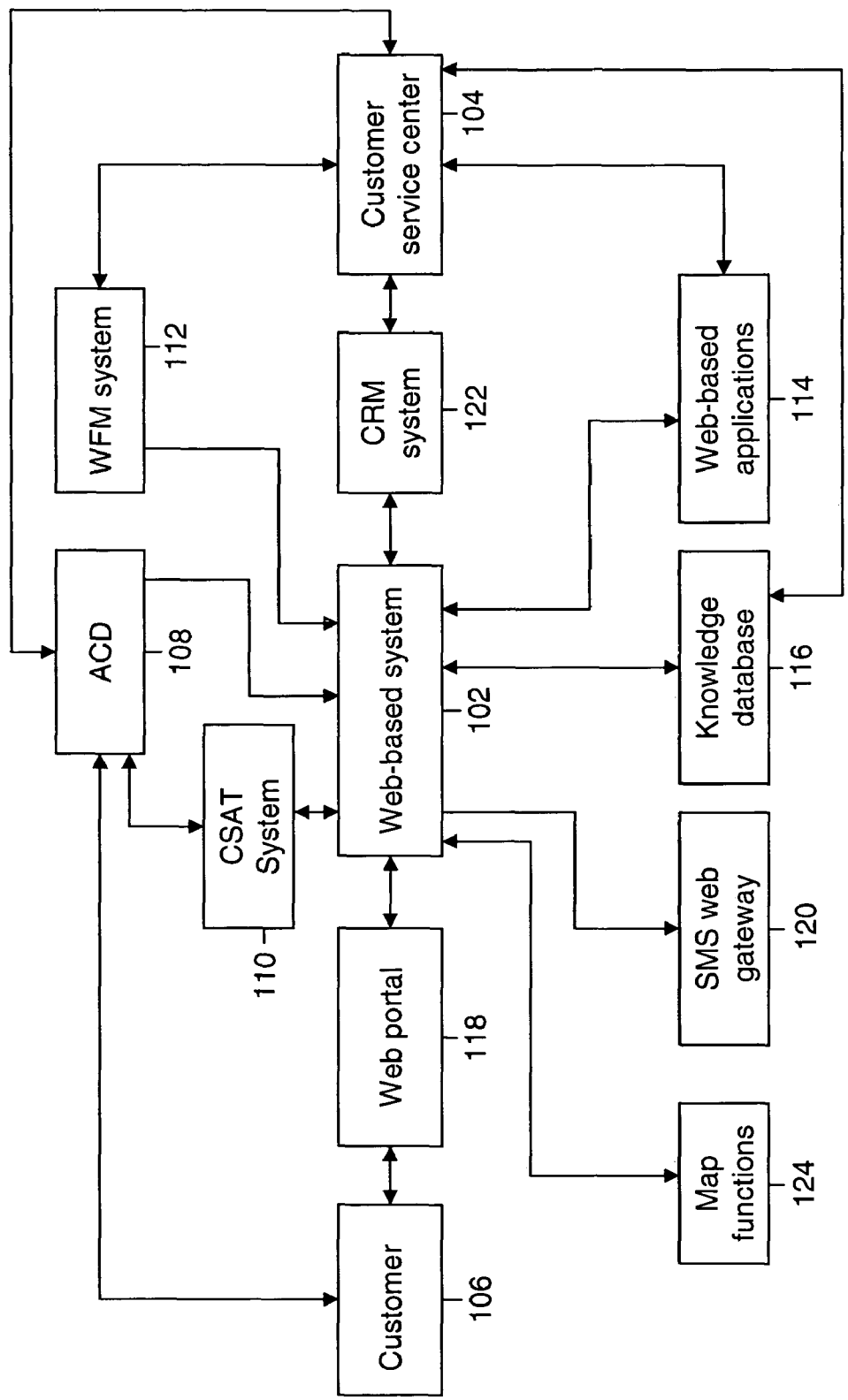
FIG. 1 is a block diagram depicting the environment of a web-based system, in accordance with an embodiment of the invention.

DESCRIPTION OF PREFERRED
EMBODIMENTS

For the sake of convenience, the terms used to describe the various embodiments have been defined below. It should be noted that these definitions are provided to merely aid in understanding the descriptions, and they do not, in any way, limit the scope of the present invention.

Customer service center: A customer service center of a company provides assistance and general support to customers of the company.

Web portal: A web portal of the company provides an interface to its customers to explore the company's website through the Internet. The website displays a web page of the company. The customers interact with the company through the web portal of the company.

Knowledge database: A knowledge database stores technical manuals and technical information. In addition to this, the knowledge database may store certain automated responses and information related to general queries from the customers. Further, the knowledge database may store details of interactions occurring between each customer and the customer service center, for a certain period of time. The interaction may comprise placing a request or a posted query through e-mail or a query entered to search for information in the knowledge database. Further, the responses sent to the customers through e-mails may be stored in the knowledge database.

Automatic Call Distributor (ACD): An ACD is a device that handles incoming and outgoing call volume, from, and to the customers. It sends a call to the first available customer representative and if all the customer service representatives are busy, plays a recorded message and puts calls in a queue until a customer representative becomes available. Examples of ACDs that are commercially available are products by companies such as Avaya, Rockwell, and Lucent. However, other similar products available commercially may also be used. When a customer calls into the customer service center, the ACD distributes the incoming calls between various customer service representatives in a manner that ensures that the customer is connected to the correct representative in minimal time. The ACD keeps a track on the estimated wait time of each queue of customers. The estimated wait time for an incoming call is the time for which the customer has to wait until he/she is connected with a customer representative at the customer service center.

Work Force Management (WFM) system: A WFM system manages and keeps track of the staffing requirements and the work schedules of customer service representatives at the customer service center. Further, the WFM system stores data related to incoming and outgoing calls on a regular basis. In addition, the WFM system stores data related to a customer representative's performance and the time taken by the customer representative to complete each customer's request. The WFM system determines statistical data, based on data collected over a period of time. The statistical data is further used to determine the relatively less busy times for each customer service representative at the customer service center. The less busy time signifies that time during the day when the number of incoming calls received by the ACD is less in proportion to the staffing levels at the customer service center than at other times of the day. This condition of less estimated wait time is therefore predictable to the extent that the incoming call volume and call arrival patterns are calculated against the staffing data. Further, the average amount of time required by the customer representative to handle the customer's request is based on statistical data determined by the WFM system. Therefore, the WFM system is capable of predicting less busy times of each queue.

Customer Satisfaction (CSAT) System: A CSAT system helps in conducting customer service related surveys and collecting feedback from customers. The CSAT system provides a means for storing, reviewing and analyzing customer feedback.

Customer Relationship Management (CRM) system: A CRM system is an industry term for software solutions, methodologies and Internet capabilities that help companies manage customer relationships in an organized manner. The CRM system includes all aspects of interaction that a company has with its customers, whether it is related to sales or service. The CRM system collects, records, and analyzes customer data so that the time taken to track the interaction of the company with a particular customer is reduced. This, in turn, helps in analyzing and predicting customer behavior in a particular market segment and/or demographic segment regarding the different products and services available.

Web-based applications: Web-based applications provide a mode of interaction between two or more persons. Each person accesses the web-based applications through the Internet. Web-based applications include, but are not limited to, chat applications, email applications, Internet talk applications, and so forth. Examples of chat applications include, but are not limited to, Yahoo!® chat, American Online® (AOL), MSN Messenger®, and the like. Examples of email applications include, but are limited to, Yahoo!® mail, Gmail®, Hotmail®, Rediffmail®, and so forth. Examples of Internet talk applications include, but are not limited to, Yahoo!® chat with voice application, Google® talk, and so forth.

Map function: A map function, usually referred to as an Internet map service, generates maps and/or provides directions to customers for a location. Examples of map functions include, but are not limited to, Yahoo!® Maps, MapQuest®, and so forth.

SMS web gateway: An SMS web gateway provides a means for sending an SMS from the Internet to a network service provider. The network service provider further sends the message to the intended destination. An example of SMS web gateway is Cingular® Wireless. However, other similar SMS web gateways known in the art can also be used.

FIG. 1 is a block diagram, depicting the environment of a web-based system 102, in accordance with an embodiment of the invention. Web-based system 102 is associated with a customer service center 104 of a company. Customer service center 104 provides assistance to customers 106 of the company. Each of customers 106 will hereinafter be referred to as customer 106. Customers 106 and customer service center 104 can interact with each other through web-based system 102. For example, a customer service center of a company providing banking facilities assists its customers in different matters, such as loan facilities, asset management, inquiry relating to personal bank accounts, and so forth.

In an embodiment of the invention, customer service center 104 is supported by systems such as an Automatic Call Distributor (ACD) 108, a CSAT system 110, a Work Force Manager (WFM) system 112, web-based applications 114, a knowledge database 116, a web portal 118, an SMS web gateway 120, a Customer Relationship Management (CRM) system 122, and a map function 124. Web-based system 102 is associated with supporting systems, namely ACD 108, CSAT system 110, WFM system 112, one or more web-based applications 114, knowledge database 116, web portal 118, SMS web gateway 120, CRM system 122, and map function 124. Web-based system 102, in conjunction with the supporting systems, establishes a contact between customers 106 and customer service center 104. Customer representatives of customer service center 104 interact and provide assistance to customers 106.

However, in case customer 106 contacts customer service center 104 through a telephone call to place a request or a query, the call is transferred to a customer representative through ACD 108. If the customer representative is busy tending another customer, customer 106 may have to wait in a queue of customers. While waiting, ACD 108 may provide a recorded message to customer 106. The recorded message may provide information such as the estimated wait time after which the customer representative would respond to customer 106. The estimated wait time for the queue of customers calling a customer representative at customer service center 104 signifies the time that customer 106 has to wait before the customer representative responds. According to a method known in the art for the calculation of estimated wait time in a customer service center, customers are already in a queue to contact a customer representative. The customer representative takes an average of x minutes to complete a request. Therefore, the customer representative would take an average of nx minutes to complete n requests from n customers. So, the estimated wait time for the $(n+1)^{th}$ customer is nx minutes. However, for the calculation of estimated wait time, several other algorithms exist in the art and may be used.

The recorded message may also direct customer 106 to web portal 118 in case customer 106 does not want to wait for the customer representative to respond. Web portal 118 provides an interface to customer 106, through which customer 106 can contact the customer service representatives through modes of contact, other than a telephone call. Examples of such modes of contacts may be, but are not limited to, chat, email, Internet talk, and so forth.

In an embodiment of the invention, if customer 106 wants to inquire about the various modes of contact that are available to contact customer service center 104, customer 106 may access web portal 118 by connecting to the Internet and visiting the website of the company. Through web portal 118, customer 106 interacts with web-based system 102, wherein web-based system 102 displays the various modes of contact available for customer 106 to contact customer service center 104, on web portal 118, along with the information related to each mode of contact. Examples of such information may be telephone numbers, chat IDs, email addresses, Internet talk IDs, estimated wait time for each mode of contact, less busy times for one or more modes of contacts, and so forth.

Customer 106 can select any desired mode of contact provided on web portal 118. For establishing a contact with customer service center 104, web-based system 102 is connected through one or more web-based applications 114 to customer service center 104. One or more web-based applications 114 include, but are not limited to, chat applications, email applications, Internet talk applications, and the like. Customer 106 may interact with customer service center 104, by making a request or asking a query through web portal 118. Based on the request or query, customer service center 104 provides a response to customer 106. The responses to customer 106 are based on the mode of contact selected by customer 106. In another embodiment of the invention, knowledge database 116 provides an automated response to the query made by customer 106.

ACD 108 provides real-time information regarding the estimated wait time to the web-based system 102. Customer 106 obtains the information regarding the estimated wait time through web-based system 102. WFM system 112 provides real time information regarding less busy times of the customer service representatives to customers 106, through web-based system 102. The less busy time signifies the duration of the day when the number of incoming calls received by the customer service center 104 in proportion to the staffing level is less compared to other times of the day. This, in turn, results in less estimated wait time in the queue. For example, at times during the day a customer service center may receive fewer incoming calls as compared to staffing, thereby reducing the estimated wait time from X hours to Y hours. The estimated wait time for the customer calling at these times would be less, thus getting a faster connection to a customer representative.

In an embodiment of the invention, SMS web gateway 120 provides a means for sending an SMS to customer 106 through the Internet, and through web-based system 102, to a network service provider. The network service provider then sends the message to the contact number of customer 106. Customer 106 may receive information through an SMS regarding the estimated wait times for different modes of contact.

In an embodiment of the invention, CSAT system 110 provides a feedback form to customer 106, through web-based system 102 at the completion of a request or a query made by customer 106. Further, CSAT system 110 collects feedback from customers 106 who contact through a telephone call via ACD 108. In another embodiment of the invention, as CSAT 110 is connected to ACD 108, CSAT 110 provides a set of prerecorded instructions to customers 106 and customers 106 may provide their feedback by punching in keys of a telephone keypad or any other device attached to the telephone. The feedback form filled out and provided by customers 106 is stored, reviewed, and analyzed by CSAT system 110. All feedback forms stored in CSAT system 110 are used as a tool to conduct a customer service related survey. The feedback forms are, further used to enhance the service provided by customer service center 104 to customers 106.

In an embodiment of the invention, CRM system 122 interfaces with customer service center 104 and web-based system 102. CRM system 122 records all the interactions that customers 106 have with a customer representative. The interaction may be through a telephone call, chat, email or Internet talk, or any other mode of contact. Further, CRM system 122 records all requests that customers 106 place through an SMS option and a call-back option. In addition, CRM system 122 records all queries entered by customers 106 to be searched in knowledge database 116. Further, CRM system 122 records the interaction of customers 106 through CSAT system 110. CRM system 122 also helps analyze and predict future marketing trends. This, in turn, helps improve customer relationships. Further, CRM system 122 helps deliver better services to customers 106.

In an embodiment of the invention, map function 124 provides a means for finding locations of companies throughout the globe. Map function 124 provides maps and directions to the nearest service and sales center of the company to customers 106.

Figure 2:
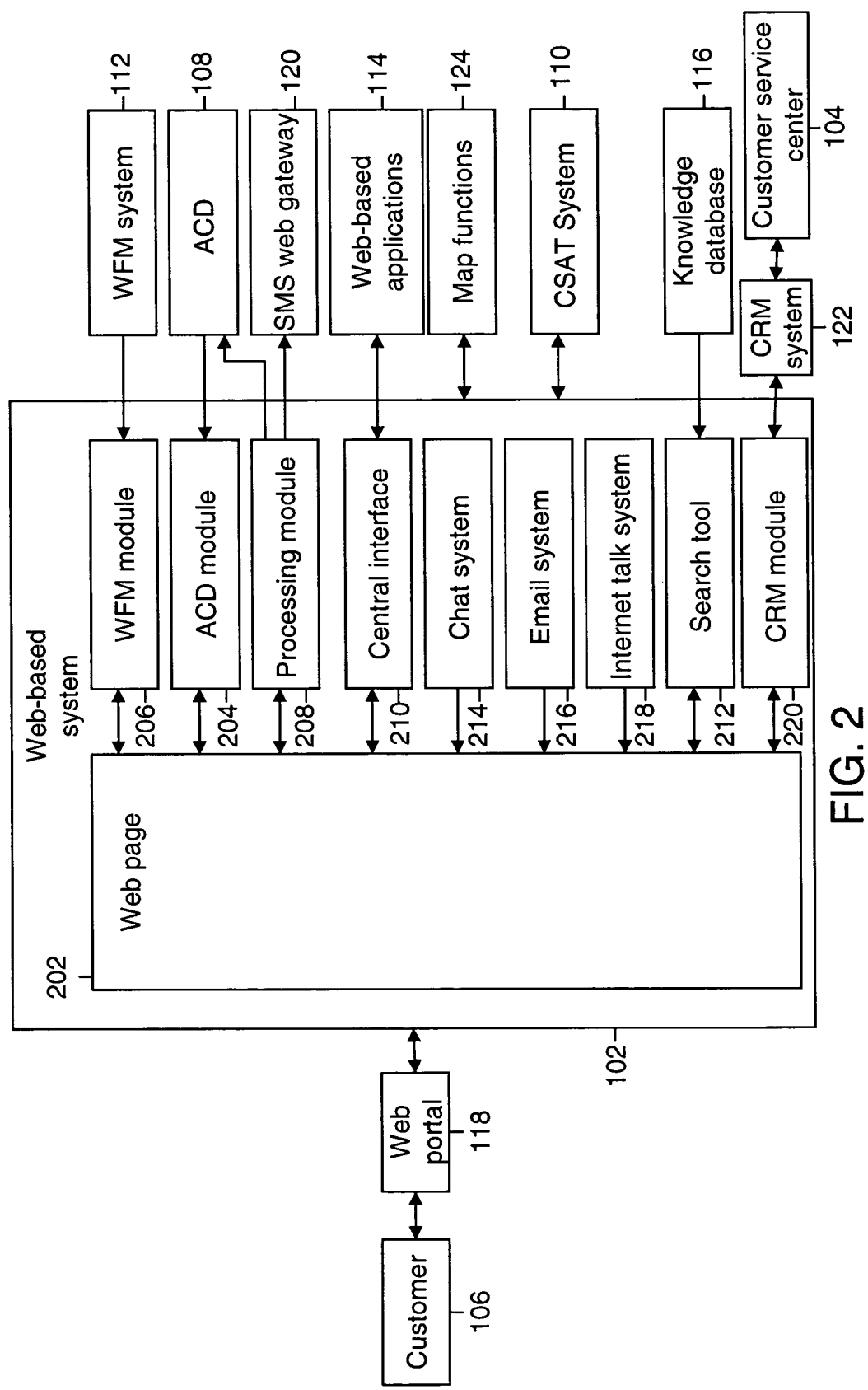
FIG. 2 is a block diagram depicting elements of the web-based system and their interaction with supporting systems, in accordance with an embodiment of the invention.

FIG. 2 is a block diagram, depicting elements of web-based system 102, in accordance with an embodiment of the invention. Web-based system 102 comprises a web page 202, an ACD module 204, a WFM module 206, a processing module 208, a central interface 210, a search tool 212, a chat system 214, an email system 216, an Internet talk system 218 and a CRM module 220.

In an embodiment of the invention, web page 202 displays one or more options that signify modes for establishing a contact between customer 106 and customer service center 104. The modes of contact include, but are not limited to, chat, email, call, Internet talk, and the like. Further, in an embodiment of the invention, web page 202 displays an estimated wait time and a less busy time for the one or more options selected by customer 106.

Further, in an embodiment of the invention, web page 202 displays a call-back option. The call-back option provides a means for placing a request to call back customer 106 corresponding to a queue. The queue refers to a queue of customers trying to establish contact with a group of customer service representatives handling particular types of requests.

When customer 106 selects the call-back option, in an embodiment of the invention, web page 202 displays a customer data collection screen corresponding to the call-back option. Customer 106 can enter data related to the call-back option through web page 202. Examples of data include, but are not limited to, personal details, contact number, the nature of request and queue selected by customer 106. Processing module 208 interacts with web page 202 and sends the data entered by customer 106 to ACD 108. ACD 108 keeps a track of the queue that customer 106 has selected, and builds a connection between customer 106 and a customer representative available among the group of customer service representatives handling the selected queue in order ACD 108 receives requests of customers 106.

In yet another embodiment of the invention, web page 202 displays a short message service (SMS) option. The SMS option is for placing an SMS request through web page 202 corresponding to a queue. The SMS request provides an SMS to customer 106, SMS being sent through SMS web gateway 120. The SMS updates customer 106 regarding the estimated wait time for a selected queue. The queue refers to a queue of customers trying to establish contact with a group of customer service representatives handling requests of a particular nature.

In an embodiment of the invention, when customer 106 selects the SMS option, web page 202 displays a customer data collection screen corresponding to the SMS option. Customer 106 enters data necessary for completion of the SMS request through web page 202. Examples of the data include, but are not limited to, information related to personal details of customer 106, a contact number for providing the SMS message, the nature of request and the queue selected. Further, the data comprises a predetermined estimated wait time selected by customer 106 and a specified time frame for which customer 106 wants to place an SMS request. Processing module 208 interacts with web page 202 and stores the data entered by customer 106 through web page 202. Processing module 208 keeps track of the estimated wait time of the queue selected by customer 106. Processing module 208 sends an SMS when the estimated wait time of the selected queue falls below the selected predetermined value of estimated wait time, within the specified time frame, to customer 106 through SMS web gateway 120. In case the estimated wait time of the selected queue does not fall below the predetermined value, processing module 208 sends an SMS notifying customer 106 about the current estimated wait time and stating that the estimated wait time will not fall below the predetermined value in the specified time frame, and recommending other times, that have a lower estimated wait time, to call the customer service center 104.

SMS web gateway 120 can be accessed through the Internet. The SMS web gateway 120, further sends the SMS to the network service provider. The network service provider sends the SMS to the contact number provided by customer 106.

In yet another embodiment of the invention, web page 202 displays a knowledge database search option. The knowledge database search option provides an interface with search tool 212 that allows a search to be conducted in knowledge database 116. If customer 106 selects the knowledge database search option, customer 106 may enter a query to be searched through web page 202. On conducting a search in knowledge database 116, web page 202 displays an automated response corresponding to the query. The automated responses corresponding to the general queries are stored in knowledge database 116. Examples of an automated response may be: "We are sorry, but we can find no relevant matches to your question. Please retype using different words or contact through email, chat, or by phone and we'll be sure to resolve your question" or if the query relates to banking problems such as home-loan facilities provided by the company, the response may be: "The home loan facilities are available at an interest of x % for a time period of p years and at an interest of y % for a time period of q years. For more details, you may contact through e-mail asking for a brochure, giving details about home loan facilities. We hope this has solved your query. You can also contact us through chat, telephone or Internet talk and give us an opportunity to serve you better". In an embodiment of the invention, if there exist frequently asked queries that do not have corresponding responses in knowledge database 116, knowledge database 116 may be updated with these queries and their corresponding responses. Further, web page 202 displays a list of modes of contact for assisting customer 106, wherein the list is arranged, based on the estimated wait time for each mode of contact available to customer 106 and the nature of query made by customer 106.

All queries made by customers 106 are stored in search tool 212 for a certain period of time. Customer representatives can retrieve these queries for their reference while serving a request. Further, these queries would help customer service representatives in understanding a request or query in less time by comparing it to those similar to ones that have been answered, in case customer 106 contacts a customer representative through any of the various modes of contact to place a request. One or more responses to the queries are stored in search tool 212 for a predetermined period of time.

In another embodiment of the invention, web-based system 102 includes central interface 210. Central interface 210 provides an interface between web page 202 and one or more web-based applications 114. Customer 106 contacts customer service center 104 through web page 202 and establishes contact with the support of web-based applications 114. Central interface 210 links web page 202 to web-based applications 114.

In yet another embodiment of the invention, web-based system 102 comprises ACD module 204, which provides an interface between ACD 108 and web page 202. ACD 108 provides real-time information regarding the estimated wait time for one of the modes of contact, the mode of contact being call. Web page 202 displays the estimated wait time provided by ACD 108 through ACD module 204.

In yet another embodiment of the invention, web-based system 102 comprises WFM module 206. WFM module 206 provides an interface between WFM system 112 and web page 202, which displays the less busy time. WFM system 112 provides information regarding the less busy time for call, the most suitable mode of contact on a real-time basis.

In yet another embodiment of the invention, web-based system 102 comprises chat system 214. Chat system 214 handles all incoming chat requests from customers 106. It tracks the chats being initiated by customers 106 for a particular duration of day and calculates the estimated wait time and the less busy time for each queue. The queue refers to a queue of customers trying to establish contact with a customer representative from a group of customer representatives, handling requests of similar type, through chat. Estimated wait time refers to the time a customer has to wait until he/she obtains a response from a customer representative through chat. Less busy time signifies the time during the day when the number of requests received by customer service center 104, in proportion to the staffing levels, is less compared to the number of requests received at other times.

In yet another embodiment of the invention, web-based system 102 comprises email system 216. Email system 216 keeps track of incoming emails from customers 106 and the responses being sent to them. In turn, email system 216 determines the estimated wait time. The estimated wait time refers to the time a customer 106 has to wait until he/she receives a response from customer service center 104.

In yet another embodiment of the invention, web-based system 102 comprises Internet talk system 218. Internet talk system 218 keeps track of all the Internet-related communications being made through customer service center 104 and calculates the estimated wait time and the less busy time for each queue. The queue refers to a queue of customers trying to establish contact with a customer representative among a group of customer representative, handling requests of similar type, through Internet talk. Estimated wait time refers to the time a customer has to wait until he/she obtains a response from a customer representative through Internet talk. Less busy time signifies that time during the day when the number of requests through Internet-related communication received by customer service center 104 in proportion to the staffing levels is less compared to the number of requests received at other times.

In yet another embodiment of the invention, web-based system 102 includes CRM module 220, which provides an interface between web page 202 and CRM system 122. CRM module 220 provides all interactions between customer 106 and customer service center 104 to CRM system 122 through web page 202. CRM module 220 provides the interaction between customer 106 and customer service center 104, using any of the modes of contact, namely, chat, email, and Internet talk, to CRM system 122. Further, CRM module 220 communicates with CRM system 122 regarding the interaction through the call-back option and the SMS option provided on web page 202. In addition, CRM module 220 communicates with CRM system 122 regarding the interaction through the queries entered by customers 106 to be searched in knowledge database 116. In addition, CRM module 220 passes on the feedback being provided by customers 106 to CRM system 122 at the end of each interaction with customer service center 104.

Figure 3:
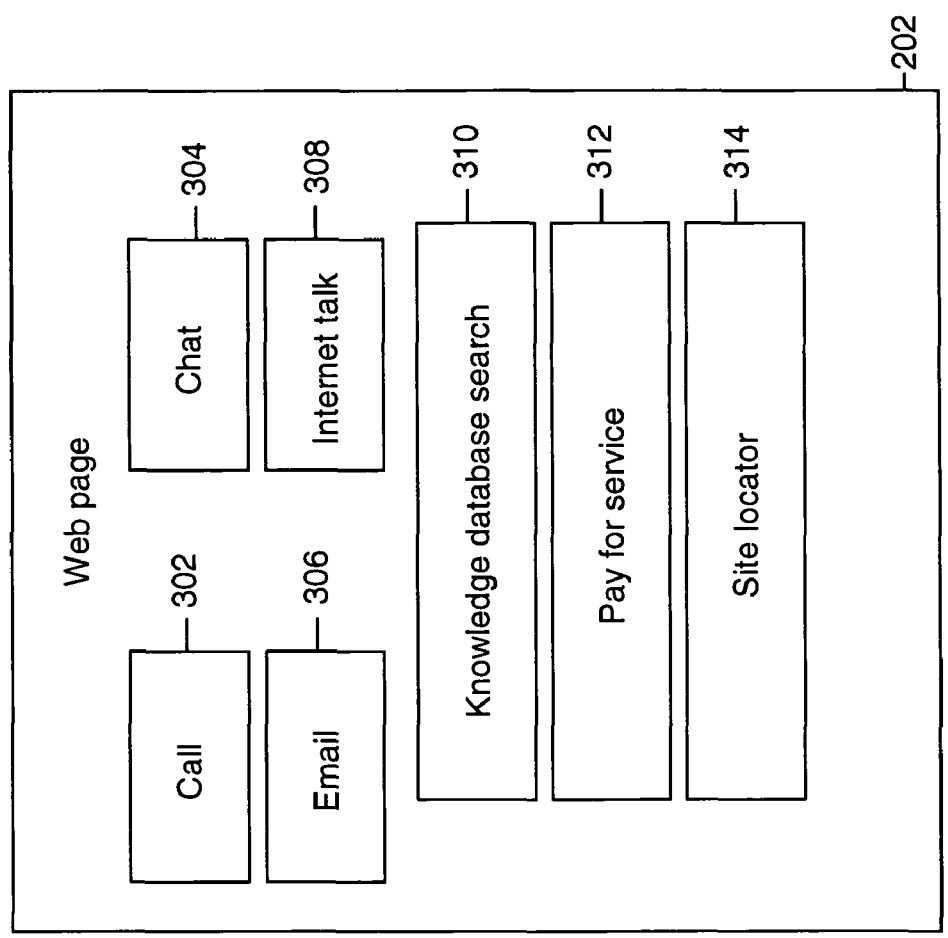
FIG. 3 illustrates content to be displayed on a web page provided by the web-based system, in accordance with an embodiment of the invention.

FIG. 3 illustrates the content displayed on a web page 202 provided by the web-based system 102, for interaction between customer 106 and customer service center 104, in accordance with an embodiment of the invention. Web page 202 includes or displays a call option 302, a chat option 304, an email option 306, and an Internet talk option 308. Web page 202 displays these one or more options, for depicting corresponding modes of contact, call, chat, email, and Internet talk, between customer 106 and customer service center 104. However, the modes of contact are not limited to the examples provided and there can be other modes known in the art.

In an embodiment of the invention, web page 202 further includes or displays a knowledge database search option 310. In another embodiment of the invention, web page 202 includes or displays pay-for-service options 312. Pay-for-service options 312 provide privileges to customers 106 who wish to pay for the services provided by customer service center 104. In case a customer selects one of the pay-for-service options, the customer is provided a set of privileges for the particular request selected. The set of privileges include, but are not limited to, faster response to the request made by customer 106. The set of privileges, further, includes a special toll-free-number to contact a customer representative through telephone. The toll-free-number, in turn, guarantees lower estimated wait time for the specified queue. The pay-for-service option further includes an option to pay a premium fee in order to exchange position in a queue of customers. Customer 106 may then pay the premium fee to obtain a faster response from a customer representative. The pay-for-service option further includes an option to obtain an 'express card' through which customer 106 gets an opportunity to exchange positions in the queue each time he/she tries to avail a service or place a request.

In yet another embodiment of the invention, the pay-for-service option further includes paid clubs that provide the set of privileges on a regular basis, and not for merely a particular request. Customer 106 may enroll themselves for the paid clubs such as a 'Premium Service Club'. In another embodiment of the invention, web page 202 can advertise for the services provided by the company, about new products and services of the company, and also provide updates regarding the available products and services.

In an embodiment of the invention, web page 202 displays a site locator 314, which provides an option to customers 106 to obtain maps and directions for locations of service and sales centers of the company. Map function 124 helps in generating maps of these locations. Customers 106 may obtain directions to the nearest service and sales center according to his/her location.

Figure 4A:
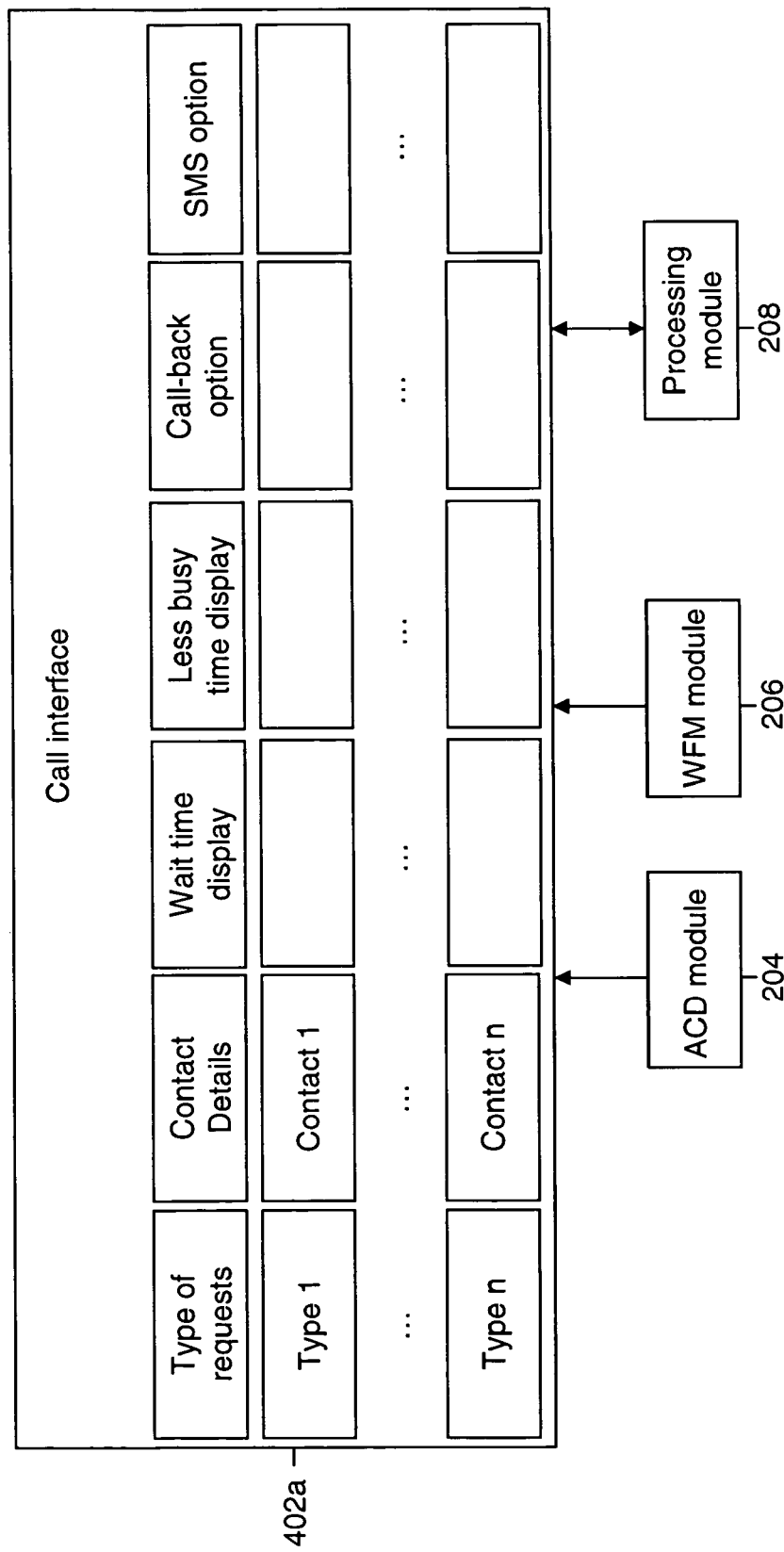
FIG. 4a illustrates a call interface provided by the web page, in accordance with an embodiment of the invention.

FIG. 4a illustrates a call interface 402a, in accordance with an embodiment of the invention. According to an embodiment of the invention, if customer 106 selects call option 302, web page 202 displays call interface 402a that includes a contact list displaying contact numbers corresponding to a particular type of request.

In an embodiment of the invention, web page 202 displays the estimated wait time corresponding to the contact numbers provided in the contact list. ACD 108 computes the estimated wait time for each contact number and provides it to web page 202, through ACD module 204.

In an embodiment of the invention, web page 202 displays the less busy time that corresponds to the contact numbers provided in the contact list. WFM system 112 computes the less busy time for each contact number and provides it to web page 202, through WFM module 206.

In an embodiment of the invention, web page 202 displays a call-back option, corresponding to the contact numbers provided in the contact list. Customer 106 places a call back request through web page 202 displaying the call-back option. The call-back option provides customer 106 an interface to place the call back request by selecting the queue according to the type of request made by customer 106. In an embodiment of the invention, if customer 106 selects the call-back option on call interface 402a, a customer data collection screen corresponding to the call-back option is displayed, described in conjunction with FIG. 2.

In yet another embodiment of the invention, web page 202 displays a short message service (SMS) option. The SMS option is for placing an SMS request, as described in conjunction with FIG. 2. The SMS option provides an SMS message that updates customer 106 regarding the estimated wait time for a selected queue. In an embodiment of the invention, if customer 106 selects the SMS option on call interface 402a, a customer data collection screen corresponding to the SMS option is displayed, as described in conjunction with FIG. 2.

Figure 4B:
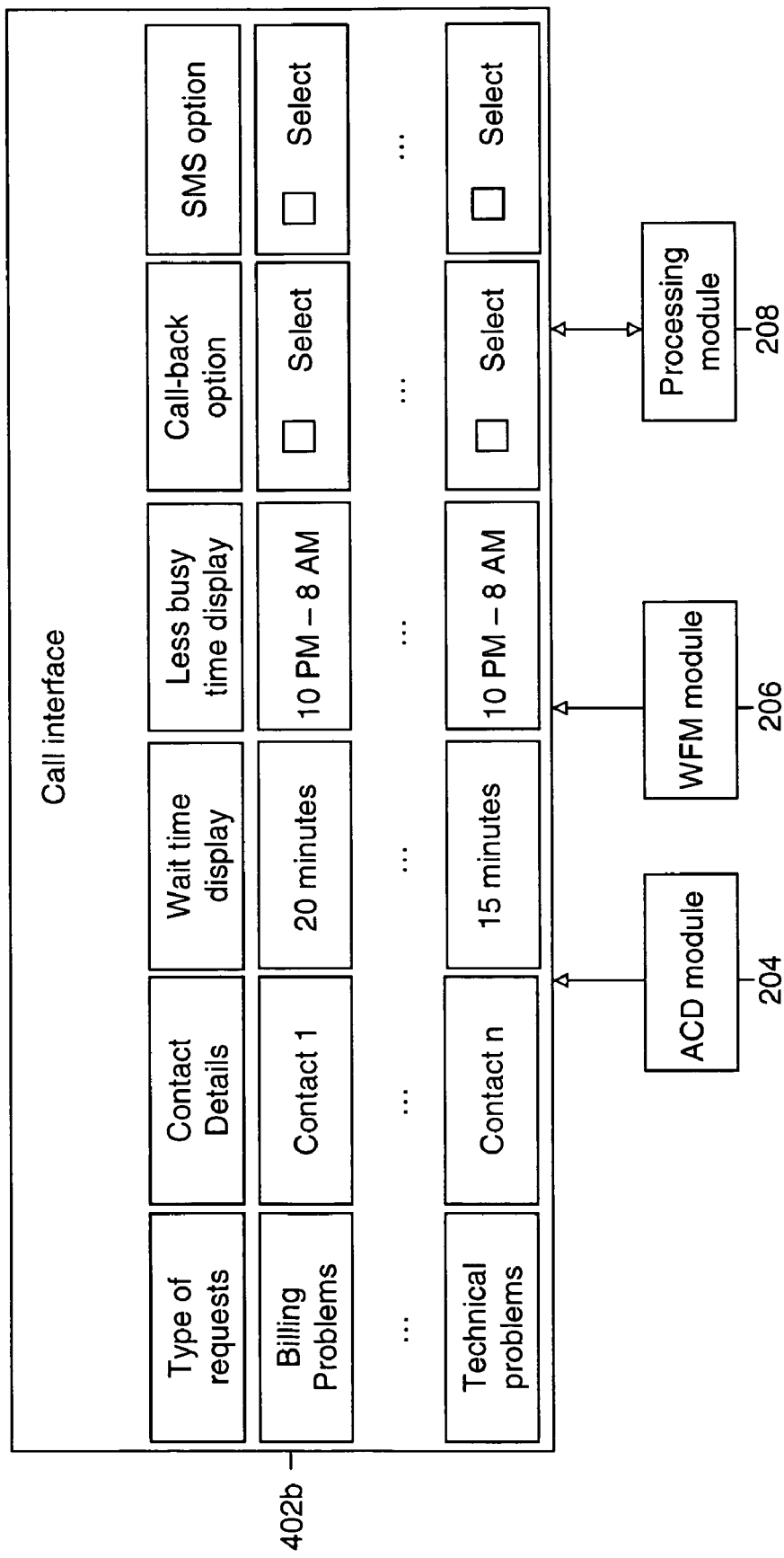
FIG. 4b illustrates an example of a call interface, in accordance with an embodiment of the invention.

FIG. 4b illustrates an example of a call interface 402b. Example of call interface 402b includes a contact list displaying contact details for different types of requests. For example, the contact details for placing requests related to billing problems are provided on web page. Example of call interface 402b further displays the corresponding estimated wait time and the less busy time for the queue relating to billing problems. In an embodiment of the invention, the estimated wait time displayed corresponding to the queue relating to billing problems is 20 minutes and the less busy time is from 10 PM to 8 AM (PST, Pacific Standard Time). Further, example of call interface 402b displays a call-back option and an SMS option. A customer may select the option to use the call back and SMS services for a particular type of request.

Figure 5A:
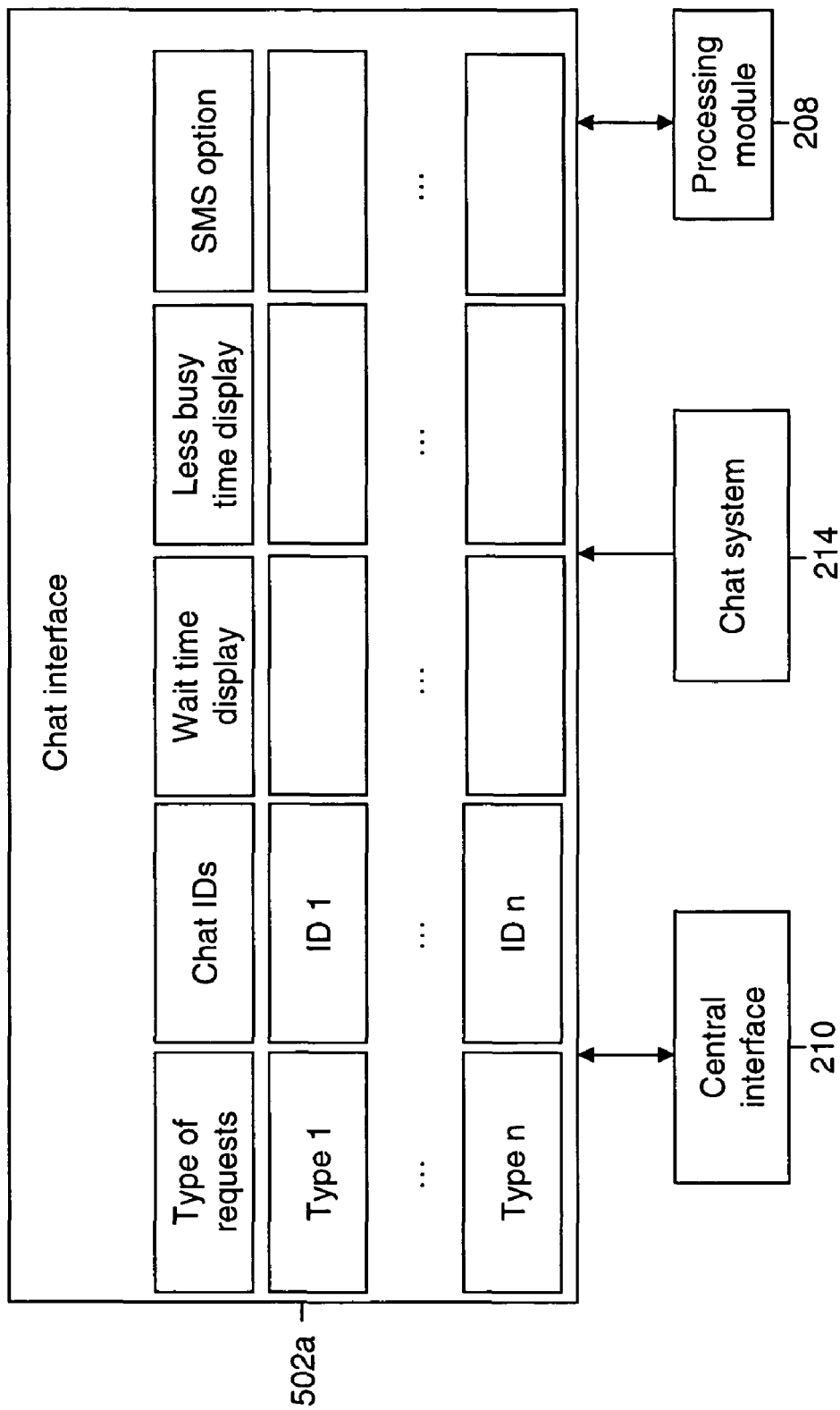
FIG. 5a illustrates a chat interface provided by the web page, in accordance with an embodiment of the invention.

FIG. 5a illustrates a chat interface 502a, in accordance with an embodiment of the invention. According to an embodiment of the invention, if customer 106 selects chat option 304, web page 202 provides chat interface 502a that displays a list of chat IDs, categorized on the basis of the type of requests. Each chat ID is provided with a link to initiate the chat with a customer representative available from a group of customer service representatives that handle the corresponding type of request. Central interface 210 provides an interface between web page 202 displaying chat IDs and web-based applications 114. Examples of the web-based applications 114 for contacting the customer service representatives through chat include, but are not limited to, Yahoo!® chat, MSN® messenger, AOL®, Rediff® chat, and so forth.

In an embodiment of the invention, web page 202 displays the estimated wait time corresponding to the chat IDs provided on chat interface 502a. The estimated wait time is provided by chat system 214.

In an embodiment of the invention, web page 202 displays the less busy time corresponding to the chat IDs provided on chat interface 502a. The less busy time is provided by chat system 214.

In an embodiment of the invention, web page 202 displays a short message service (SMS) option. The SMS option is for placing an SMS request, as described in conjunction with FIG. 2. The SMS option provides an SMS message to update customer 106 regarding the estimated wait time for a selected queue. In an embodiment of the invention, if customer 106 selects the SMS option on chat interface 502a, a customer data collection screen corresponding to the SMS option is displayed, described in conjunction with FIG. 2.

Figure 5B:
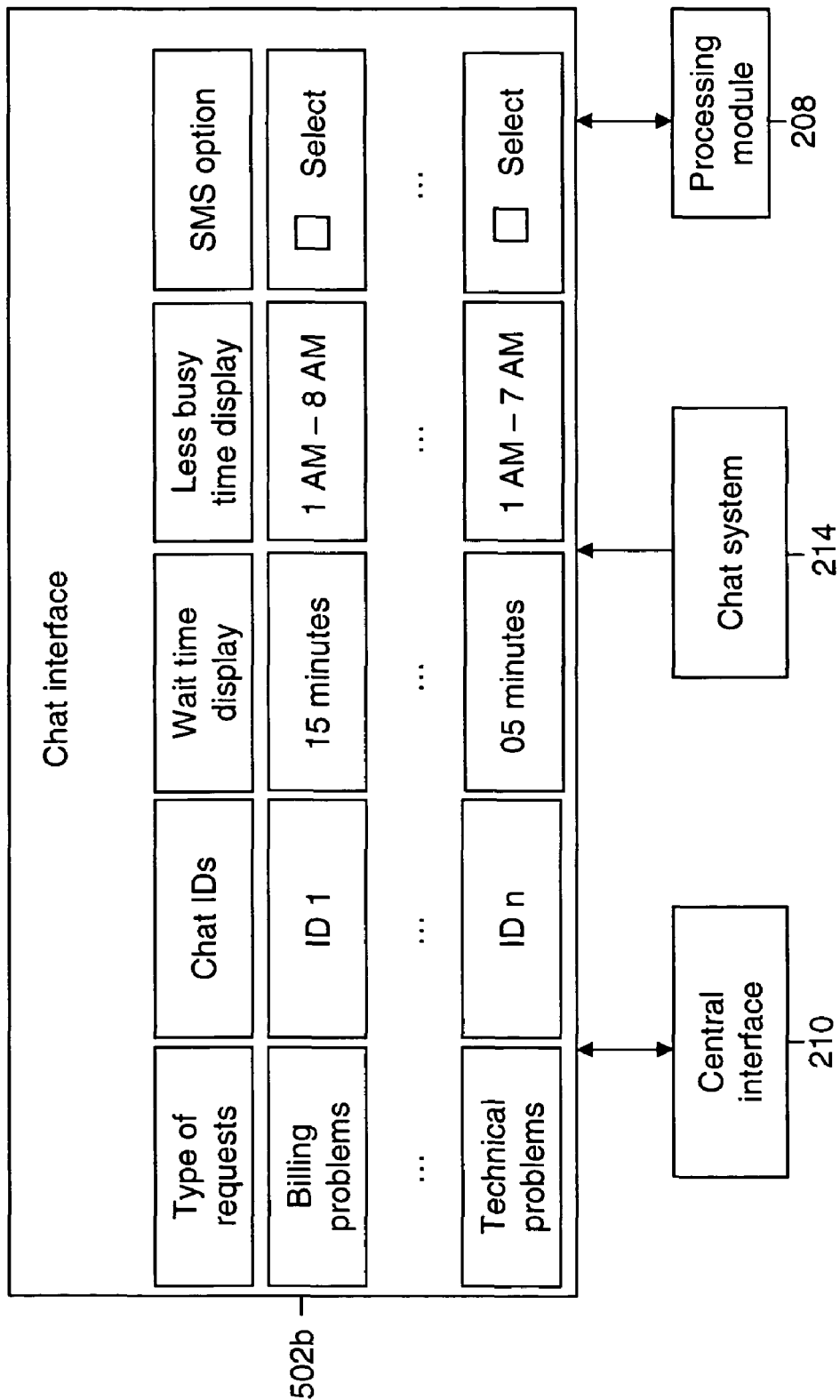
FIG. 5b illustrates an example of a chat interface, in accordance with an embodiment of the invention.

FIG. 5b illustrates an example of a chat interface 502b. Example of chat interface 502b displays the list of chat IDs categorized on the basis of type of requests. The list of chat IDs displays the chat IDs corresponding to particular types of requests with corresponding links to initiate the chat. Web page displays a chat ID for placing a request related to billing problems. Further, example of chat interface 502b displays the estimated wait time and the less busy time corresponding to the type of request. In an embodiment of the invention, the estimated wait time displayed is 15 minutes and the less busy time is from 1 AM to 8 AM (PCT). Example of chat interface 502b further displays an SMS option. A customer may select a chat ID corresponding to the type of request to avail the SMS service, using the SMS option.

Figure 6A:
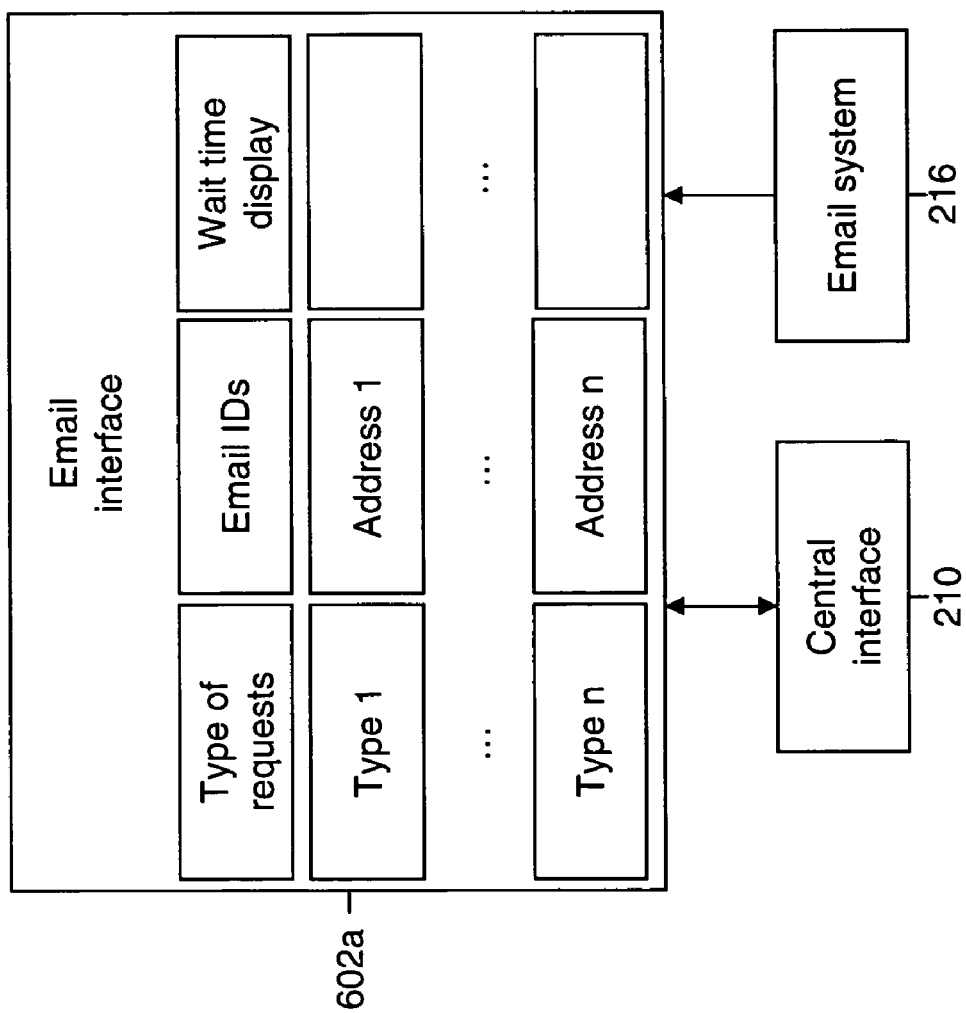
FIG. 6a illustrates an e-mail interface provided by the web page, in accordance with an embodiment of the invention.

FIG. 6a illustrates an email interface 602a, in accordance with an embodiment of the invention. If customer 106 selects email option 306, web page 202 provides email interface 602a that displays a list of email addresses categorized on the basis of the type of requests. Central interface 210 provides an interface between web page 202 displaying the list of email addresses and web-based applications 114. Customer 106 may send a request through an email. However, customer 106 may ask for a response through an email or an SMS. In another embodiment of the invention, email interface 602a displays the estimated wait time corresponding to the email IDs. The displayed estimated wait time provides the time required by customer service center 104 to respond to customer 106. The estimated wait time is provided by an email system 216.

Figure 6B:
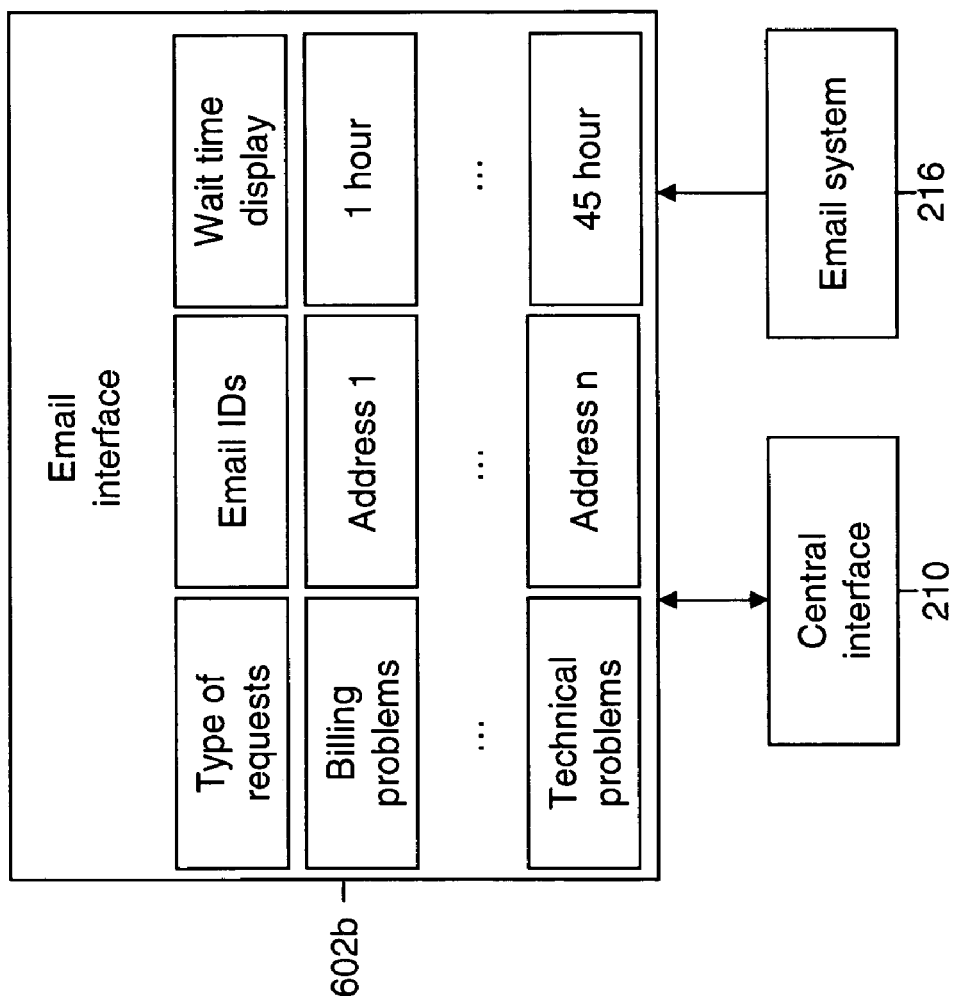
FIG. 6b illustrates an example of an e-mail interface, in accordance with an embodiment of the invention.

FIG. 6b illustrates an example of an email interface 602b, which displays a list of email IDs categorized on the basis of type of requests. In the example of email interface 602b, Address 1 is an email address for placing requests related to billing problems. In an embodiment of the invention, the corresponding estimated wait time for Address 1 displayed on email interface 602b is one hour.

Figure 7A:
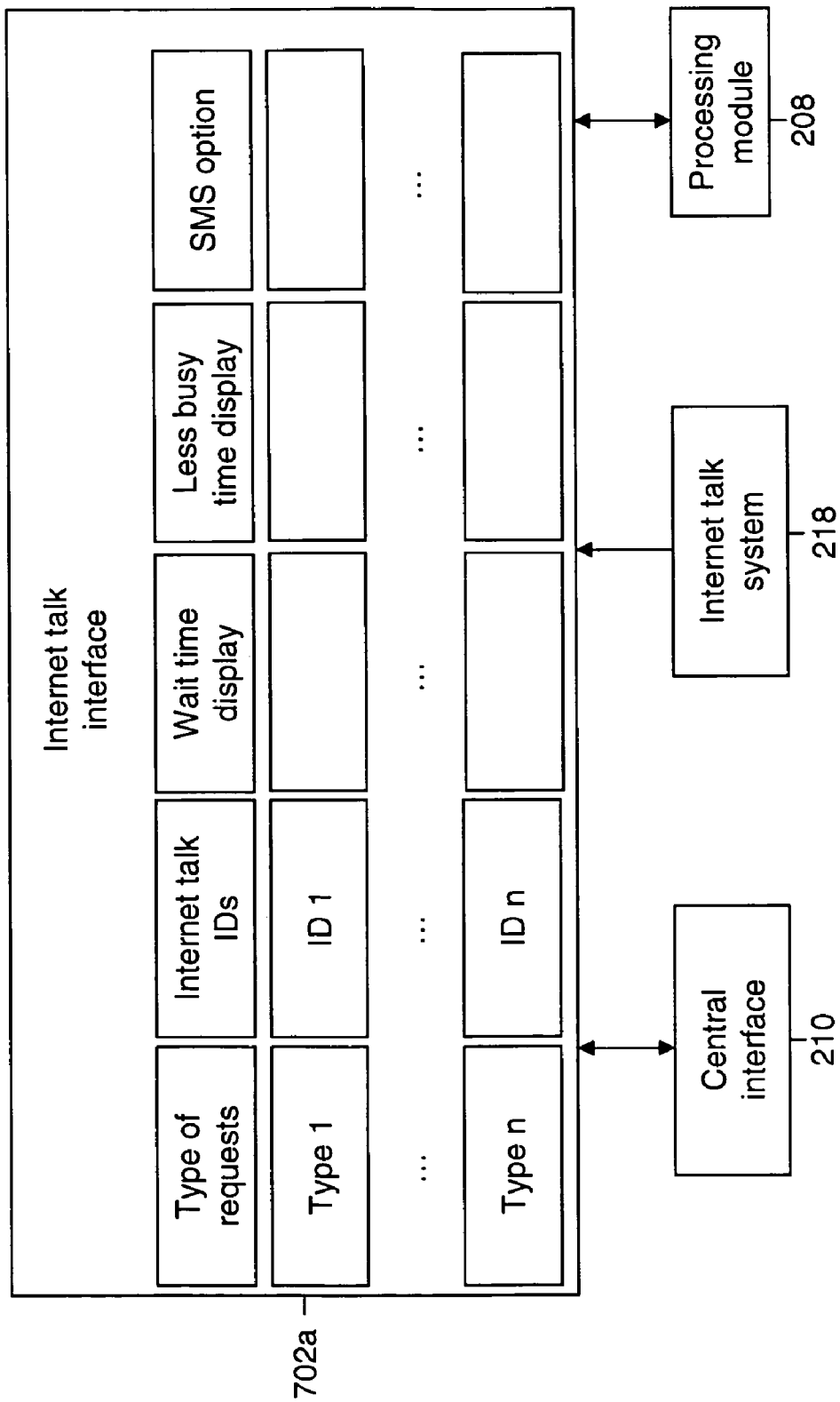
FIG. 7a illustrates an Internet talk interface provided by the web page, in accordance with an embodiment of the invention.

FIG. 7a illustrates an Internet talk interface 702a, in accordance with an embodiment of the invention. According to an embodiment of the invention, if customer 106 selects Internet talk option 308, web page 202 provides Internet talk interface 702a that displays a list of Internet talk IDs categorized on the basis of the type of requests. Each Internet talk ID is provided with a link to initiate an Internet communication with the corresponding customer representative. Customer 106 selects a link corresponding to the type of request customer 106 wants to place. Web page 202 displays a request from for an Internet talk. Customer 106 provides his/her Internet talk ID through the request form. Further, customer 106 mentions a specified time frame within which a customer representative handling the stated type of request may initiate the Internet talk with customer 106. As soon as a customer representative handling the stated type of request is available, he/she initiates an Internet talk with customer 106. Central interface 210 provides an interface between web page 202 displaying the list of Internet talk IDs and web-based applications 114. Web-based applications 114 include, but are not limited to, Yahoo!® chat with voice application, Google® talk, and the like. In another embodiment of the invention, Internet talk interface 702a displays the estimated wait time corresponding to the list of Internet talk IDs. In yet another embodiment of the invention, web page 202 displays the less busy time corresponding to the list of Internet talk IDs. Internet talk system 218 provides the corresponding estimated wait time and the less busy time.

Figure 7B:
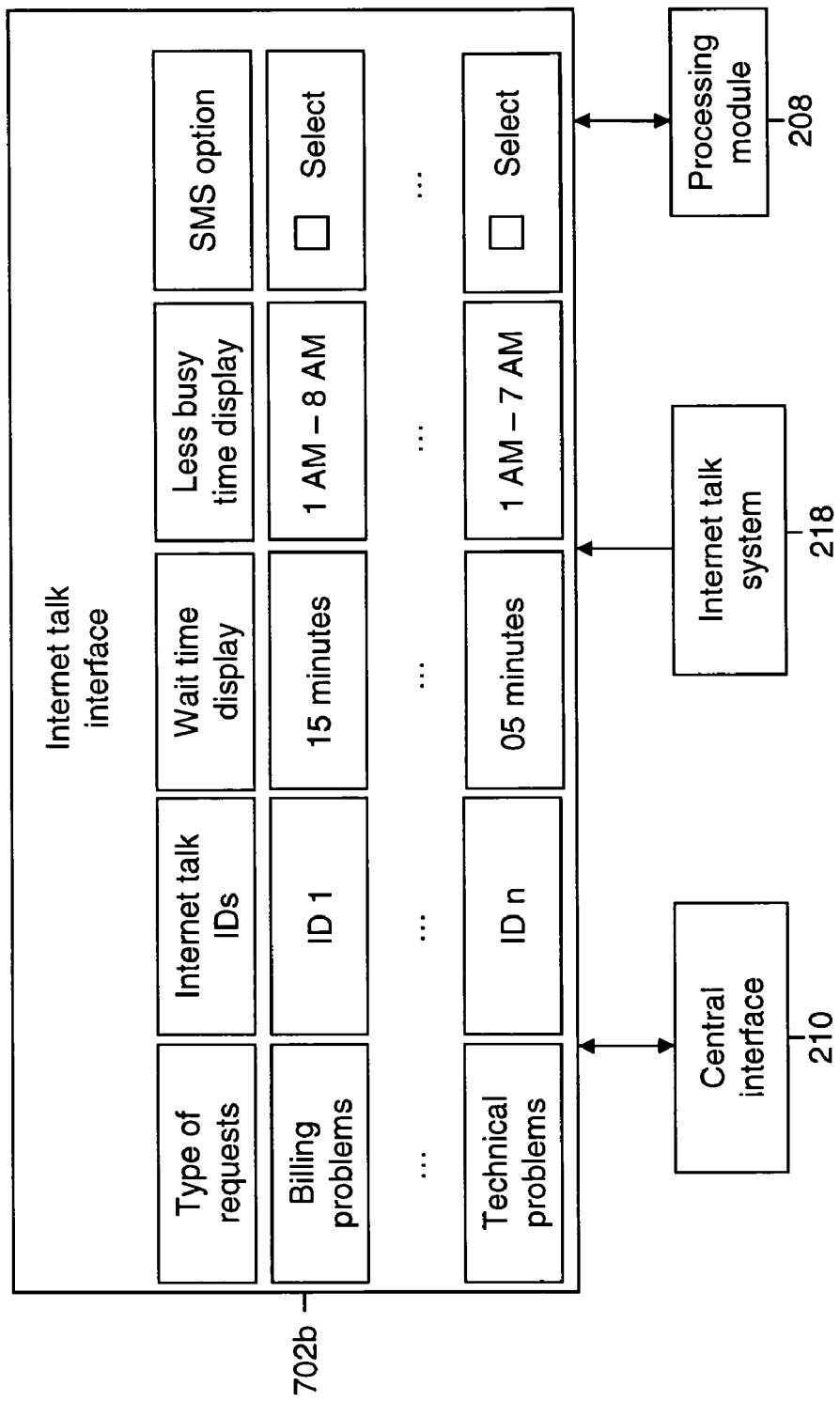
FIG. 7b illustrates an example of an Internet talk interface, in accordance with an embodiment of the invention.

FIG. 7b illustrates an example of an Internet talk interface 702b. Internet talk interface 702b displays the list of Internet talk IDs categorized on the basis of the type of requests. For example, the Internet talk ID for placing requests related to billing problems is displayed on Internet talk interface 702b. Internet talk interface 702b displays corresponding estimated wait time and less busy time for each Internet talk ID. In an embodiment of the invention, the estimated wait time displayed is 15 minutes and the less busy time is from 1 to 8 AM (PCT). Further, Internet talk interface 702b displays an SMS option.

Figure 8:
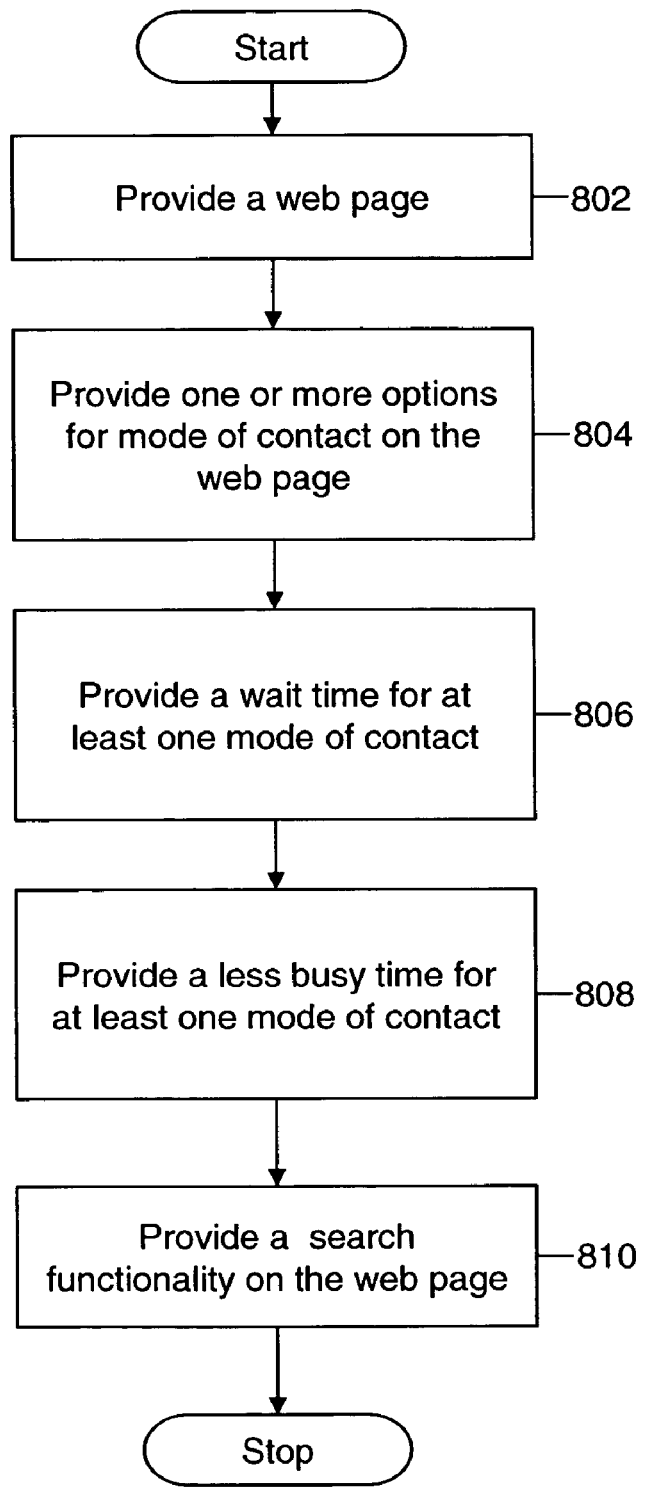
FIG. 8 is a flowchart, illustrating a method for providing assistance to a customer, in accordance with an embodiment of the invention.
Figure 9A:
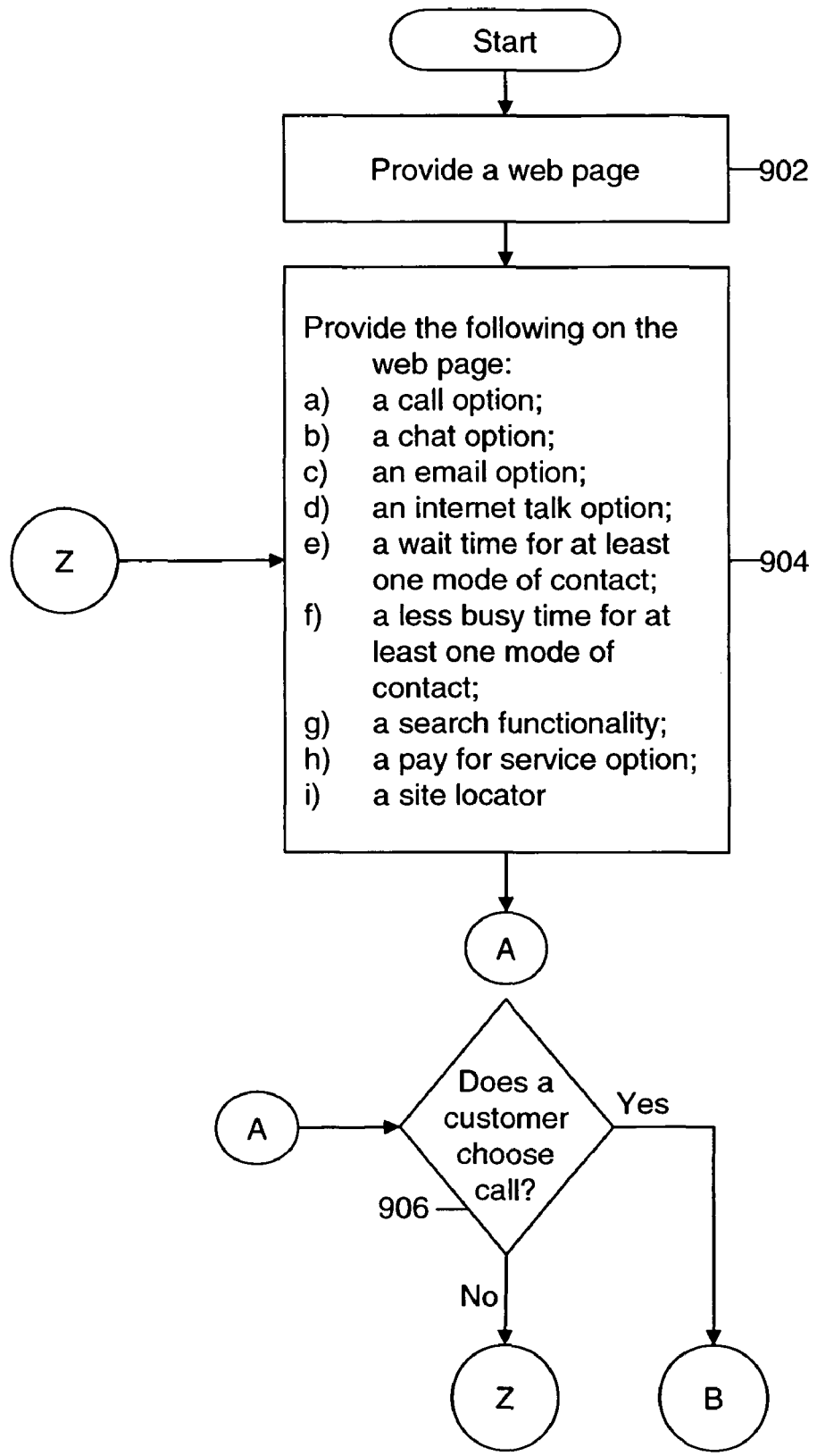
FIGS. 9a, 9b, 9c, 9d, 9e, and 9f illustrate a flowchart that presents a method for providing assistance to a customer, in accordance with another embodiment of the invention.
Figure 9B:
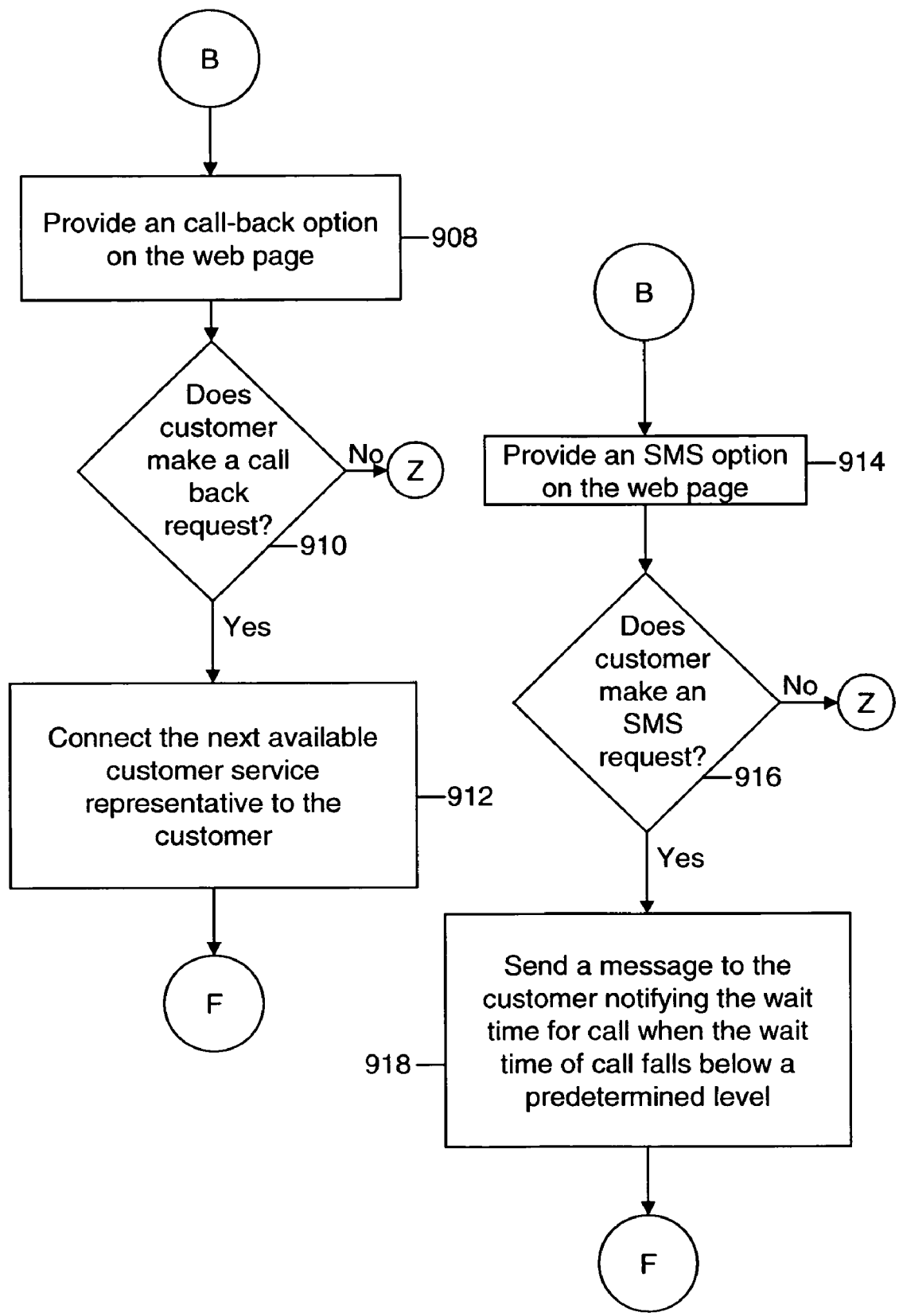
Figure 9C:
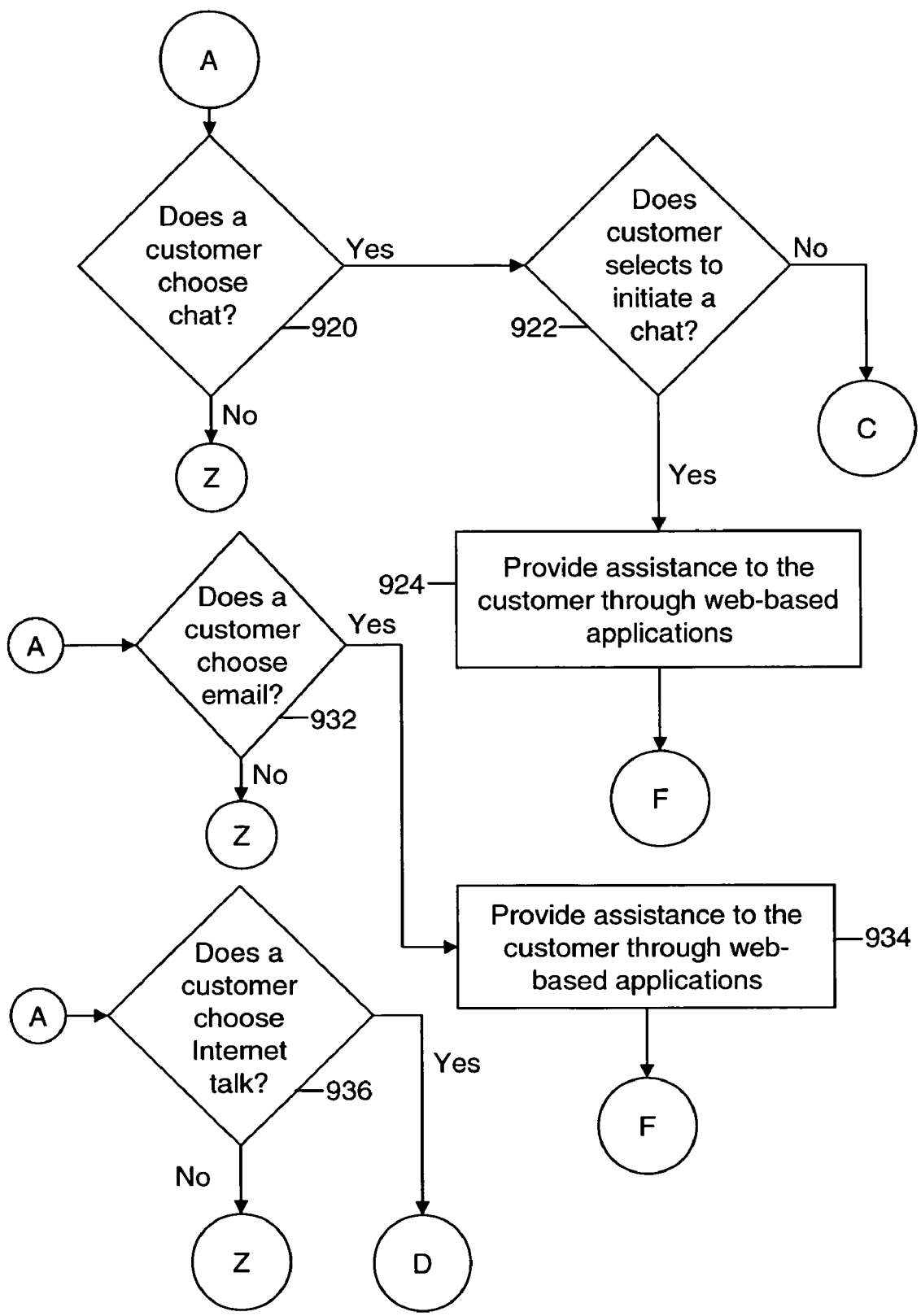
Figure 9D:
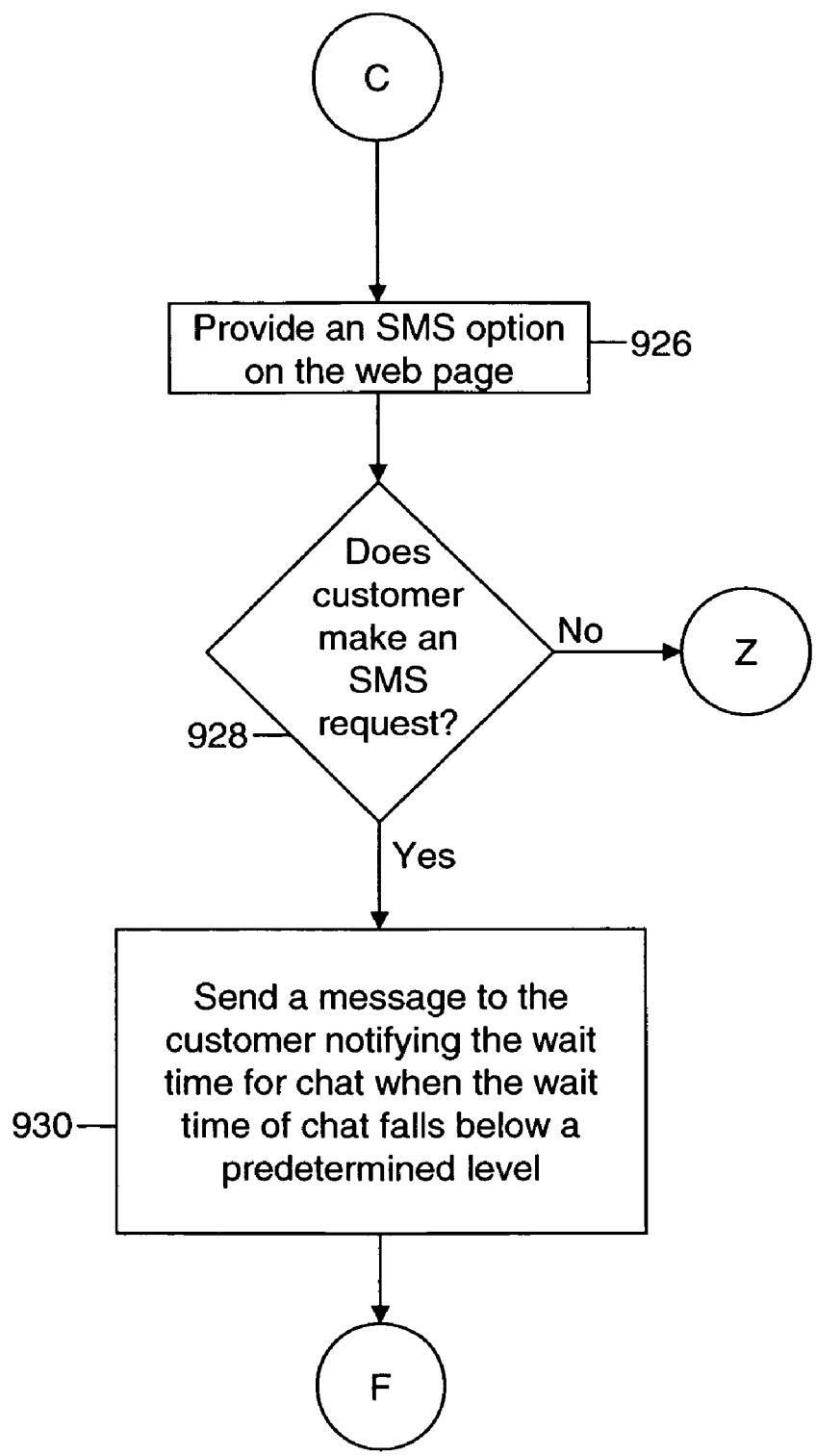
Figure 9E:
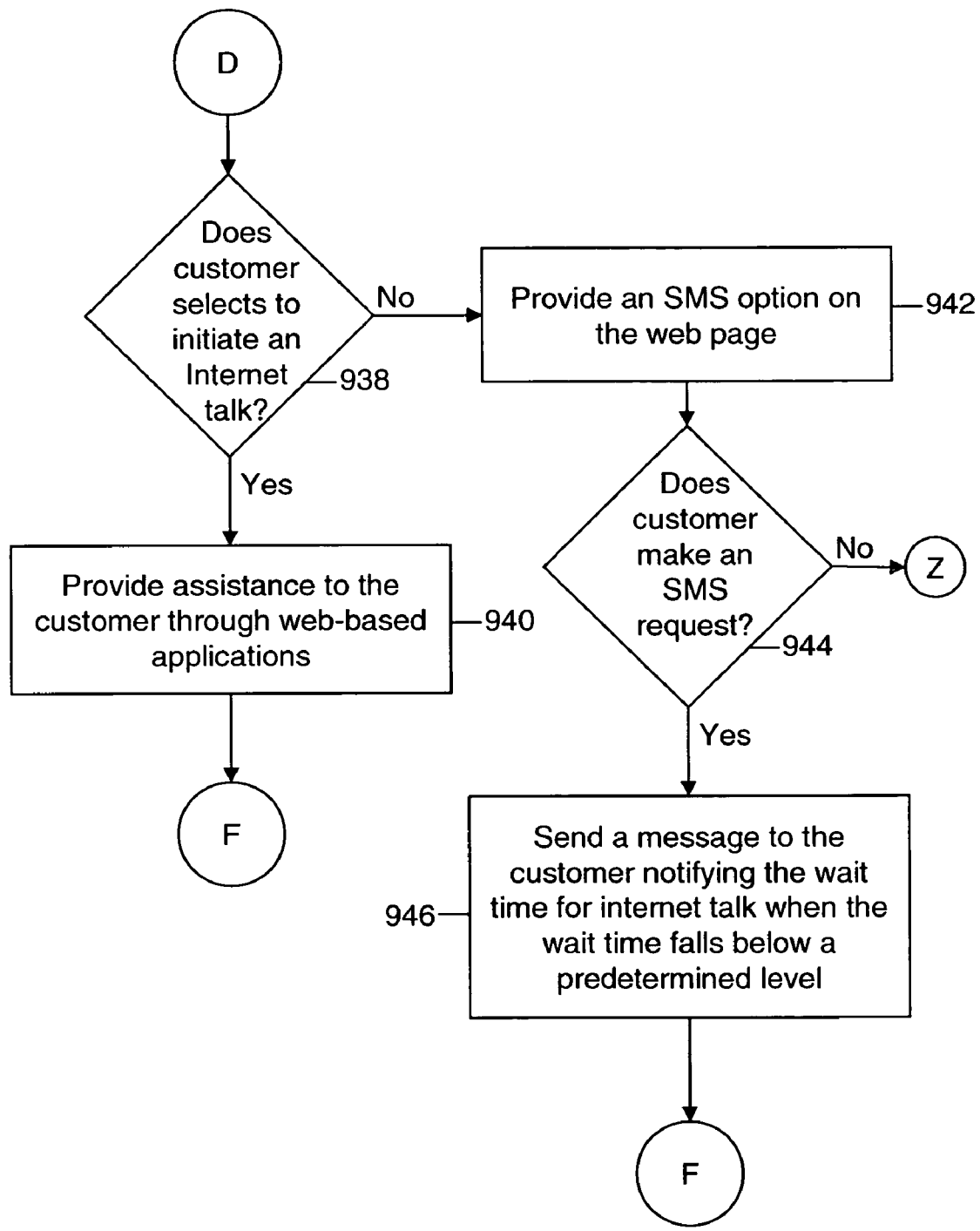
Figure 9F:
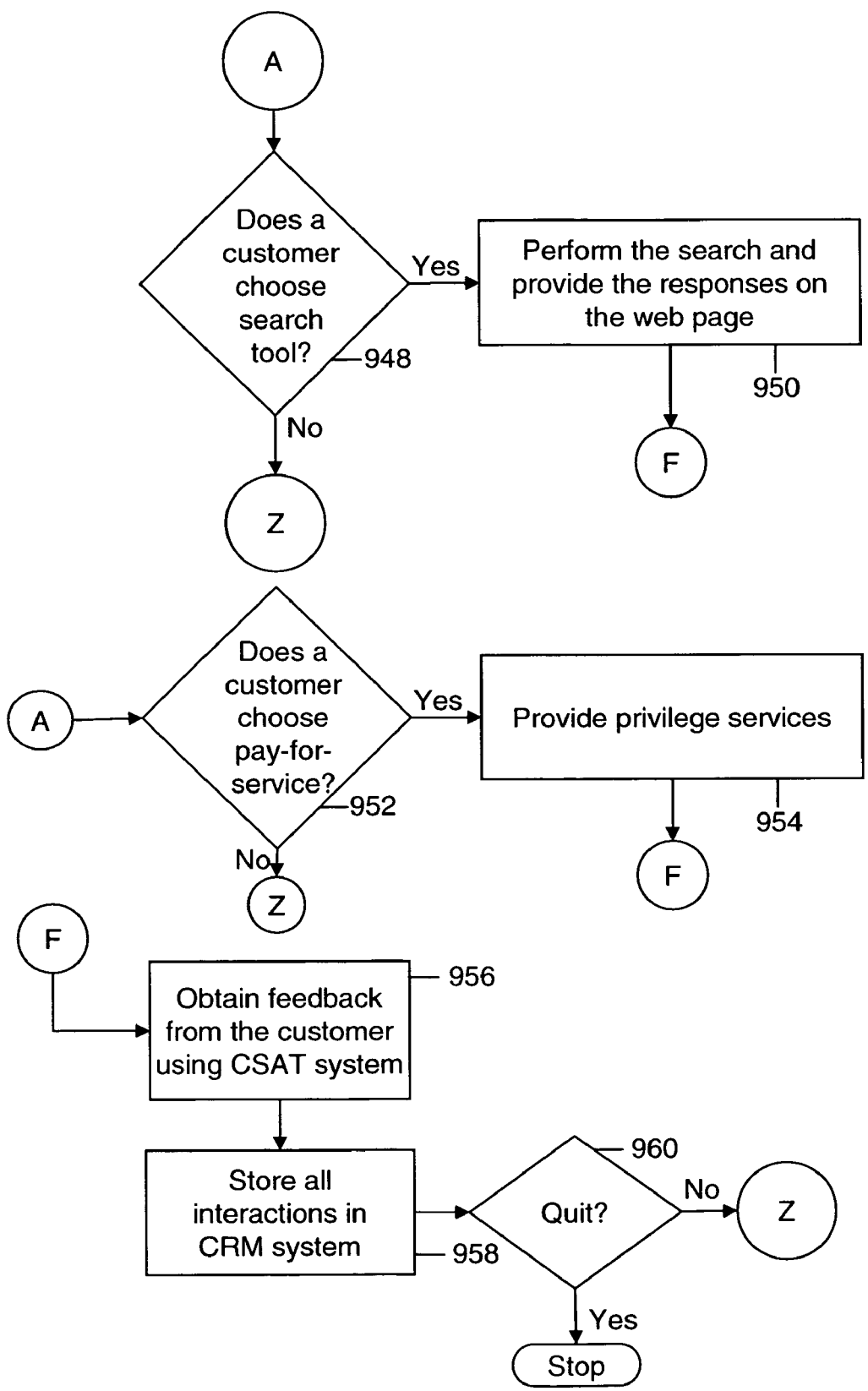

FIG. 8 is a flowchart, illustrating a method for interacting and providing assistance to customers, in accordance with an embodiment of the invention. At step 802, a web page is provided to a customer through a company's web portal. The customer interacts with a customer service center of the company through the web page. At step 804, one or more options are provided on the web page. The one or more options signify different modes for establishing contact between the customer and the customer service center. The modes of contact include, but are not limited to, chat, call, email, Internet talk, and so forth. A central interface acts as an interface between the web page and the web-based applications, to establish contact between the customer and the customer service center. The customer can make a request through at least one of the modes of contact provided by the central interface. This request is sent to the customer service center. A customer representative at the customer service center responds and provides assistance through the mode of contact the customer has used to contact the customer service center. However, according to an embodiment of the invention, if a customer uses email as a mode of contact to place a request, the customer may ask for a response through an SMS, instead of an email. At step 806, estimated wait time is provided for at least one of the modes of contact on the web page. The estimated wait time for call is provided by an ACD on a real-time basis. An ACD module provides the interface between the web page and the ACD. The estimated wait times for other modes of contact, i.e., chat, e-mail and Internet talk are provided by a chat system, an email system and an Internet talk system, respectively. At step 808, a less busy time is provided for at least one mode of contact on the web page. The less busy time is provided by a WFM system for call, a mode of contact, on real-time basis. A WFM module provides an interface between the web page and the WFM system. The less busy times for other modes of contact such as chat, e-mail, Internet talk are provided by the chat system, the e-mail system and the Internet talk system, respectively. At step 810, a knowledge database search option is provided on the web page to conduct a search in a knowledge database. The search is conducted with the help of a search tool. The search tool is interfaced with the web page. A query to be searched is entered by the customer through the web page. A search for the query is conducted in the knowledge database, and an automated response for the query is displayed on the web page. Along with the automated response, a list of the modes of contact arranged on the basis of the estimated wait times for the modes of contact and the nature of the query is displayed on the web page.

FIGS. 9a, 9b, 9c, 9d, 9e and 9f illustrate a flowchart of a method for interacting and providing assistance to customers, in accordance with another embodiment of the invention. At step 902, a web page is provided to a customer through a web portal of the company. The customer interacts with a customer service center through the web page. At step 904, one or more options for displaying the various modes of contact are provided on the web page. The one or more options for signifying the modes of contact include, but are not limited to, a call option, a chat option, an email option and an Internet talk option. A central interface provides an interface between the web page and web-based applications. The web-based applications are used for establishing contact between the customer and the customer service center. Further, an estimated wait time for at least one mode of contact is provided on the web page. The estimated wait time for the call is provided by an ACD on a real-time basis. An ACD module provides the interface between the web page and the ACD. The estimated wait times for other modes of contact, i.e., chat, e-mail and Internet talk are provided for a chat system, an e-mail system and an Internet talk system, respectively. In addition, a less busy time for at least one mode of contact is provided on the web page. The less busy time for call, a mode of contact, is provided by a WFM system on real-time basis. A WFM module provides an interface between the web page and the WFM system. The less busy times for other modes of contact, i.e., chat, e-mail and Internet talk are provided by the chat system, the e-mail system and the Internet talk system, respectively. Further, a knowledge database search option is provided on the web page to conduct a search in a knowledge database. The search for a query made by the customer is conducted with the help of a search tool. This search tool is interfaced with the web page through which the query is entered. In addition, a pay-for-service option is provided on the web page along with an option to locate the nearest service and sales center. Maps or directions may be retrieved for a location through a map function.

At step 906, the customer is given an option to select a call option. The call option provides a call interface wherein a list of contact numbers categorized on the basis of type of request is displayed. The customer may make a request to the customer service center by placing a call through a contact number displayed on the web page. At step 906, if the customer selects the call option, a call-back option corresponding to the contact numbers is provided on the call interface at step 908 and an SMS option is provided at step 914. At step 910, the customer is given an option to place a call back request by selecting the call-back option for a queue corresponding to a type of request provided on the call interface. Along with selecting the call-back option, the customer fills a customer data collection screen that is displayed on the web page. The data entered by the customer is stored in a processing module. The data is further sent to the ACD through the processing module. The customer would receive a call back as soon as a customer representative corresponding to the type of request is available. At step 912, the next available customer representative handling the selected queue is connected to the customers through the ACD. The available customer service representatives are connected to the customers through the ACD in the order in which the ACD receives the call back requests. If the customer does not select the call-back option at step 910, the customer is redirected to step 904. At step 914, an SMS option corresponding to the contact numbers is provided on the call interface. At step 916, the customer is given an option to select the SMS option for a queue corresponding to a type of request through the call interface. Along with selecting the SMS option, the customer fills a customer data collection screen displayed on the web page. The data entered by the customer is stored in the processing module. If the customer selects the SMS option at step 916 and fills the customer data collection screen, an SMS is sent by the processing module when the estimated wait time of the selected queue falls below a predetermined value of estimated wait time within the specified time frame to the customer, at step 918. The processing module sends the SMS to an SMS web gateway. The SMS is sent through the SMS web gateway to a network service provider through the Internet. The network service provider, in turn, delivers the SMS to the customer. The customer receives a notification regarding the estimated wait time through the SMS. In case the estimated wait time of the queue never falls below the predetermined value, an SMS notifies the customer to call, stating that the estimated wait time never falls below the predetermined value within the time frame and recommending other suitable times, with lower estimated wait time to the customer. If the customer does not select the SMS option at step 916, the customer is redirected to step 904.

At step 920, the customer is given an option to select the chat option. The chat option provides a chat interface, wherein a list of chat IDs is categorized on the basis of the type of request. If the customer selects the chat option at step 920, then, at step 922, the customer is given an option to initiate and place a request through chat with a customer representative at the customer service center by selecting a link corresponding to a chat ID provided on the chat interface. If the customer does not select the chat option at step 920, the customer is redirected to step 904. At step 924, if the customer chooses to initiate and place a request through chat, the customer is provided assistance by the customer representative through chat. The web page is connected to web-based applications through the central interface. The contact through chat, between the customer and the customer service center, is established through web-based applications. A few examples of web-based applications are, Yahoo!® chat, MSN® messenger, AOL®, and Rediff® chat. If the customer does not choose to initiate and place a request through chat at step 924, an SMS option is provided on the chat interface corresponding to the chat IDs at step 926. At step 928, the customer is given an option to select the SMS option for a queue corresponding to a chat ID displayed on the chat interface. Along with selecting the SMS option, the customer fills a customer data collection screen displayed on the chat interface. The data entered by the customer is stored in the processing module, which keeps a track of the queue. At step 930, if the customer selects the SMS option, an SMS is sent when the estimated wait time of the chat falls below a predetermined value of estimated wait time within the specified time frame to the customer. The processing module sends the SMS to the SMS web gateway. The SMS is sent through the SMS web gateway to the network service provider through the Internet. The network service provider, in turn, delivers the SMS to the customer. The customer receives a notification regarding the estimated wait time through the SMS. In case the estimated wait time of the queue never falls below the predetermined value, an SMS is sent to the customer, notifying that the estimated wait time never falls below the predetermined value within the said time frame and recommending the customer other times, with lower estimated wait time for chatting. If the customer does not select the SMS option at step 930, the customer is redirected to step 904.

At step 932, the customer is given the option to select the e-mail option. The email option provides an email interface, wherein a list of e-mail addresses is categorized on the basis of the type of request on to the web page. The request to be made by the customer is sent through email. If the customer selects the email option at step 932, assistance is provided to the customer through e-mail, at step 934. In an embodiment of the invention, the customer may ask for assistance through an SMS. If the customer does not select the e-mail option at step 932, the customer is redirected to step 904.

At step 936, the customer is given the option to select the Internet talk option. The Internet talk option provides Internet talk interface, wherein a list of Internet talk IDs are categorized on the basis of the type of request on the web page. If the customer does not select the Internet talk option, the customer is redirected to step 904. At step 938, the customer is given the option to initiate and place a request through an Internet talk by selecting and providing a link that corresponds to an Internet talk ID on the Internet talk interface. The link provides a request form to be filled in by the customer. The customer provides his/her Internet talk ID through the request form. If the customer chooses to initiate and place a request through the Internet talk option at step 938, assistance is provided to the customer through Internet talk as soon as a customer representative, handling the type of request made by the customer, is available, at step 940. A contact is established between the customer and a customer representative at the customer service center with the help of the web-based applications. The central interface interfaces the web page and the web-based applications. Examples of the web-based applications for Internet talk are, but are not limited to, Google® talk, Yahoo!® chat with voice, and the like. At step 942, if the customer does not choose to initiate and place a request through the Internet talk option at step 938, an SMS option corresponding to the Internet talk IDs is provided on the Internet talk interface. At step 944, through the Internet talk interface, the customer is given the option to select the SMS option for a queue corresponding to an Internet talk ID. Along with selecting the SMS option, the customer fills a customer data collection screen displayed on the web page. The data entered by the customer is stored in the processing module. The processing module keeps a track of the queue. At step 946, if the customer selects the SMS option at step 944, an SMS is sent to the customer if the estimated wait time of the Internet talk falls below a predetermined value of estimated wait time within the specified time frame. The processing module sends the SMS to the SMS web gateway. The SMS is sent through the SMS web gateway to the network service provider through the Internet. The network service provider, in turn, delivers the SMS to the customer. The customer receives a notification regarding the estimated wait time through the SMS. In case the estimated wait time of the queue never falls below the predetermined value, an SMS is sent to the customer, notifying that the estimated wait time never falls below the predetermined value within the time frame and recommending to the customer other times, with lower estimated wait time, to use Internet talk as a mode of contact. If the customer does not select the SMS option at step 944, the customer is redirected to step 904.

At step 948, the customer is given a knowledge database search option to conduct a search using the search tool on the web page. The search tool is interfaced with the web page. A query to be searched is entered by the customer through the web page. The query is searched with the help of the search tool in a knowledge database. At step 950, if the customer selects the knowledge database search option at step 948 and enters a query, an automated response is displayed on the web page to conduct the search in the knowledge database. Further, a list of the modes of contact, arranged according to the estimated wait times for the modes of contact and the nature of the query, is displayed on the web page. All queries made by the customer and their responses are stored for predetermined time in the search tool. If the customer does not select the knowledge database search option at step 948, the customer is redirected to step 904.

At step 952, the customer is given an option to select a pay-for-service option. At step 954, if the customer selects the pay-for-service option, a set of privileges is provided to the customer on selecting the pay-for-service option. The customer pays a certain amount to avail certain services. The set of privileges include, but are not limited to, faster response to the request made by the customer. The customer is further provided with an option to pay a premium fee to exchange positions in a queue. The customer would, in turn, get a faster response from the customer representative at the customer service center by placing himself/herself ahead of other customers in the queue. The customer may, further, buy an 'express card'. This would enable the customer to exchange positions in a queue each time he/she avails any service or places a request. In an embodiment of the invention, the customer is provided with an option to join paid clubs. A set of privileges for the services is provided to the customer enrolled in the paid club. Advertisements, updates on products and services, new products and services are displayed on the web page. If the customer does not select the pay-for-service option at step 952, the customer is redirected to step 904. At step 956, after each interaction with the customer using the one or more modes of contact, the knowledge database search option, or the pay-for-service option, the customer is asked to fill a customer feedback form through a customer assistance feedback option. The customer fills in customer feedback form and provides the feedback related to the services provided by the customer service center. The feedback forms are collected by a CSAT system and are, further, used to review and analyze the customers' feedback to provide better services to the customers.

At step 958, interactions between the customers and the customer service center, using the one or more modes of contact, the knowledge database search option, or the pay-for-service option, are stored in a CRM system. An interface is provided between the CRM system and the web page through a CRM module. The interactions between the customer and the customer service center may be through the web page, a telephone call through the ACD or through any other means. The interactions through the web page include, but are not limited to, chat, e-mail or Internet talk. Further, all requests placed by the customers through the call-back option and the SMS option are stored in the CRM system. In addition, all queries made by the customers to be searched in the knowledge database are recorded in the CRM system. Further, the feedback forms and other interactions with the CSAT system are recorded in the CRM system. The recorded data is analyzed and used to predict future marketing by the CRM system. This, in turn, helps in improving customer relationships and delivering better products and services to the customers. After step 958, the customer is given an option to quit from the web page, at step 960. If the customer does not choose to quit, the customer is redirected to step 904.

The method and the system described above are applicable to one or more companies. A web page displays options for interacting with customer service centers of the one or more companies. The web page is interfaced to the web portals of the one or more companies. The method and system, as described above, imply individually to the web-based systems of respective one or more companies.

The various embodiments of the present invention exemplify the following advantages. The method and system described in the present invention enables the customer to contact the customer service center through the different modes of contact available on a single web page. The awareness of other alternatives other than telephone call to contact the customer service center helps in reducing reliance on telephone calls only. Moreover, the estimated wait time and the less busy time are provided for each mode of contact on the web page. This helps in leveling spikes in the incoming and outgoing call patterns of the customer service center. Further, the method and system described in the present invention provide storing of certain automated responses to the most frequent queries by the customers, which in turn, reduces the overall cost of providing customer service. Moreover, it helps in reducing the overall staffing requirement of customer service representatives. The method and system allows the company to conduct customer service related surveys with ease. This helps in improving the services and products delivered to the customers. Further, the web page can help in advertising the products and services that the company offers. In addition, the web page may advertise new products, new services and their updates. The web page advertising helps in improving the brand name of the company in the market.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor. The microprocessor is connected to a communication bus. The computer also includes a memory. Memory may include random access memory (RAM) and read only memory (ROM). The computer system further comprises a storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for providing assistance to a customer of a company through a web based system, the company having a customer service center, the customer service center supported by an automatic call distributor (ACD), a work flow management (WFM) system, a web portal, one or more web-based applications, a knowledge database, map functions, a short message service (SMS) web gateway, a customer satisfaction (CSAT) system and a customer relationship management (CRM) system, the method comprising:
   a. providing a web page on the web portal, the web page acting as an interface between the customer and the customer service center of the company;
   b. providing one or more options on the web page to be selected by the customer, the one or more options corresponding to one or more modes of contact between the customer and customer service representatives at the customer service center including telephone, chat, email, Internet talk, and SMS;
   c. providing, with the ACD, an estimated wait time on the web page in real-time, for at least one of the one or more modes of contact based on a type of request, a queue of customers, a number of customer service representatives (CSR) at the customer service center, and an average amount of time required by the CSR to handle the type of request;
   d. providing, with the WFM system, a less busy time on the web page for at least one of the one or more modes of contact based on the type of request, the number of incoming calls received by the customer service center in proportion to the number of CSRs at the customer service center, and the average amount of time required by the CSRs to handle the type of request; and
   e. providing a knowledge database that the customer searches for information related to general queries and that provides prediction-driven automated responses that correspond to a customer query including information derived from previous interactions between customers and CSRs.

2. The method of claim 1 further comprising a step of displaying a call-back option for the customer, the call-back option being displayed on the web page.

3. The method of claim 2, wherein the ACD automatically connects the customer and a customer representative if the customer selects the call-back option.

4. The method of claim 1 further comprising a step of sending a message to the customer based on the one or more options selected by the customer.

5. The method of claim 1 further comprising a step of sending a message to the customer, when estimated wait time for the one or more options selected by the customer falls below a predetermined value.

6. The method of claim 1 further comprising a step of sending a message to the customer when estimated wait time for the one or more options selected by the customer never falls below a predetermined value, within a predetermined interval of time.

7. The method of claim 1 further comprising a step of providing one or more pay-for-service options on the web page.

8. The method of, claim 7, wherein the one or more pay-for-service options allow the customer in a queue of customers to exchange positions with other customers in the queue.

9. The method of claim 1 further comprising a step of displaying a site locator option on the web page, the site locator option providing maps and directions for a physical location to the customers.

10. The method of claim 1 further comprising a step of collecting feedback from the customer for the assistance provided to the customer through the web based system.

11. The method of claim 1, wherein the knowledge database stores details of interactions occurring between each customer and the customer service center.

12. The method of claim 11, wherein the knowledge database search option is used for searching details of interactions occurring between each customer and the customer service center.

13. The method of claim 1 further comprising a step of recording all interaction between the customers and the customer service center.

14. A computer program product for providing assistance to a customer of a company through a web based system, the company having a customer service center, the customer service center supported by an automatic call distributor (ACD), a work flow management (WFM) system, a web portal, one or more web-based applications, a knowledge database, map-functions, short message service (SMS) web gateway, a customer satisfaction (CSAT) system and a customer relationship management (CRM) system, the computer program product comprising a computer readable medium having a computer readable program code embodied therein, the computer readable program code containing instructions for performing the steps of:
   a. providing a web page on the web portal, the web page acting as an interface between the customer and the customer service center of the company;
   b. providing one or more options on the web page to be selected by the customer, the one or more options corresponding to one or more modes of contact between the customer and customer service representatives at the customer service center including telephone, chat, email, Internet talk, and SMS;
   c. providing, with the ACD, an estimated wait time on the web page in real-time, for at least one of the one or more modes of contact based on a type of request, a queue of customers, a number of customer service representatives (CSR) at the customer service center, and an average amount of time required by the CSR to handle the type of request;

d. providing, with the WFM system, a less busy time on the web page for at least one of the one or more modes of contact based on the type of request, the number of incoming calls received by the customer service center in proportion to the number of CSRs at the customer service center, and the average amount of time required by the CSRs to handle the type of request; and e. providing a knowledge database that the customer searches for information related to general queries and that provides prediction-driven automated responses that correspond to a customer query including information derived from previous interactions between customers and CSRs.

15. A web based system for providing assistance to a customer of a company, the company comprising a customer service center, the customer service center supported by an automatic call distributor (ACD), a work flow management (WFM) system, a web portal, one or more web-based applications, a knowledge database, map functions, short message service (SMS) web gateway, a customer satisfaction (CSAT) system and a customer relationship management (CRM) system, the web based system comprising:

a. a web page, the web page being provided on the web portal of the company, the web page comprising:
   i. one or more options corresponding to one or more modes of contact between customer service representatives at the customer service center, and the customer including telephone, chat, email, Internet talk, and SMS;
   ii. an estimated wait time for at least one or more options selected by the customer that is calculated in real-time and is based on the type of request, the number of incoming calls received by the customer service center in proportion to the number of CSRs at the customer service center, and the average amount of time required by the CSRs to handle the type of request;
   iii. a less busy time for at least one or more options selected by the customer based on the type of request, the number of incoming calls received by the customer service center in proportion to the number of CSRs at the customer service center, and the average amount of time required by the CSRs to handle the type of request; and
   iv. a knowledge database search option for allowing the customer to search the knowledge database for information related to general queries, b. an ACD module, the ACD module interacting with the automatic call distributor and the web page to generate the estimated wait time;

c. a WFM module, the WFM module interacting with the work flow management and the web page to generate the less busy time;

d. a central interface provided between the web page and the one or more web-based applications; and e. a search tool, the search tool interacting with the web page and the knowledge database to obtain information related to general queries and that provides prediction-driven automated responses that correspond to a customer query including information derived from previous interactions between customers and CSRs.

16. The web based system of claim 15 further comprising a chat system, the chat system providing the estimated wait time and the less busy time for chat between the customer and the customer service representatives.

17. The web based system of claim 15 further comprising an email system, the email system providing the estimated wait time and the less busy time for email between the customer and the customer service representatives.

18. The web based system of claim 15 further comprising an Internet talk system, the Internet talk system providing the estimated wait time and the less busy time for Internet talk between the customer and the customer service representatives.

19. The web based system of claim 15 further comprising a CRM module, the CRM module interacting with the web page and the CRM system.

20. The web based system of claim 15, wherein the web page displays a call-back option and a short message service option.

21. The web based system of claim 20 further comprising a processing module, wherein the processing module interacts with the ACD to connect one of the customer service representatives to the customer, if the customer selects the call-back option.

22. The web based system of claim 21, wherein the processing module sends a message to the customer based on a predetermined condition, if the customer selects the SMS option.

23. The web based system of claim 22, wherein the predetermined condition is the estimated wait time of a mode of contact selected by the customer falling below a predetermined level, within a predetermined amount of time.

24. The web based system of claim 22, wherein the predetermined condition is the estimated wait time never falling below a predetermined level, within a predetermined amount of time.

25. The web based system of claim 15, wherein the web page further comprises information regarding the one or more modes of contact.

26. The web based system of claim 15, wherein the web page further comprises information regarding one or more pay-for-service options, wherein the pay-for-service options provide the customer a set of privileges upon paying a certain amount for a service.

27. The web based system of claim 15, wherein the web page further comprises a site locator option, wherein the site locator option interacts with the map function and provides maps and directions for physical locations to the customer.

28. The web based system of claim 15, wherein the web page further comprises a customer assistance feedback option, wherein the customer assistance feedback option interacts with the CSAT system and provides an option to the customer to provide feedback relating to the assistance provided by the customer service center.

29. The web based system of claim 15, wherein the knowledge database stores details of interactions occurring between each customer and the customer service center.

30. The web based system of claim 15, wherein the search tool searches in the knowledge database of the company for details of interactions occurring between each customer and the customer service center.

31. The web based system of claim 15, wherein the search tool stores a query entered by the customer for a predetermined time.

32. The web based system of claim 31 wherein the search tool stores one or more responses to the query for a predetermined time.

\* \* \* \* \*